US010426292B2

(12) United States Patent
Roever et al.

(10) Patent No.: US 10,426,292 B2
(45) Date of Patent: Oct. 1, 2019

(54) TEMPERATURE REGULATION DEVICE

(71) Applicant: The Vollrath Company, L.L.C., Sheboygan, WI (US)

(72) Inventors: Peter Roever, West Bend, WI (US); Jill Hundley, Sheboygan, WI (US); Megan Raspel, Sheboygan, WI (US)

(73) Assignee: THE VOLLRATH COMPANY, L.L.C., Sheboygan, WI (US)

( * ) Notice: Subject to any disclaimer, the term of this patent is extended or adjusted under 35 U.S.C. 154(b) by 395 days.

(21) Appl. No.: 15/141,570

(22) Filed: Apr. 28, 2016

(65) Prior Publication Data
US 2017/0311752 A1    Nov. 2, 2017

(51) Int. Cl.
*A47J 36/24* (2006.01)
*A47J 36/34* (2006.01)

(52) U.S. Cl.
CPC .......... *A47J 36/2483* (2013.01); *A47J 36/34* (2013.01)

(58) Field of Classification Search
CPC .. A47J 36/24; A47J 36/34; A47J 27/00; A47J 27/14; A47J 39/00; B65D 1/34; B65D 1/36; H05B 6/06; H05B 6/12
USPC ......... 99/483, 448, 449, 447, 426, 339, 340, 99/484, 485, 504; 220/3.9, 3.92, 3.94, 220/4.26, 8, 4.31; 219/622, 621
See application file for complete search history.

(56) References Cited

U.S. PATENT DOCUMENTS

| | | | |
|---|---|---|---|
| 2,257,580 A | 9/1941 | Trompeter | |
| 3,713,780 A * | 1/1973 | Shapiro | B01L 3/502 |
| | | | 206/222 |
| 3,782,801 A * | 1/1974 | Zimmermann | A47B 81/06 |
| | | | 220/8 |
| 3,884,135 A * | 5/1975 | Lohr | A47J 27/14 |
| | | | 99/348 |
| 4,159,769 A * | 7/1979 | Hatten | B65D 1/34 |
| | | | 206/527 |
| 5,037,084 A | 8/1991 | Flor | |
| 5,203,257 A | 4/1993 | Goad | |
| 5,453,596 A * | 9/1995 | Verveniotis | A47J 36/2483 |
| | | | 219/433 |
| 5,638,806 A * | 6/1997 | Foust | A47J 36/34 |
| | | | 126/214 A |

(Continued)

FOREIGN PATENT DOCUMENTS

| | | |
|---|---|---|
| EP | 0635225 A1 | 1/1995 |
| EP | 0635225 B1 | 4/1997 |

(Continued)

OTHER PUBLICATIONS

Search Report for International Application No. PCT/US2017/029790, dated Aug. 29, 2017, 10 pages.

*Primary Examiner* — Dana Ross
*Assistant Examiner* — Joe E Mills, Jr.
(74) *Attorney, Agent, or Firm* — Foley & Lardner LLP

(57) ABSTRACT

Temperature regulation devices for heating food are disclosed. The temperature regulation device is configured to heat food held in a food pan positioned in a well of food service equipment. The temperature regulation device includes a module or housing and heating element, and is configurable in a variety of positions, orientations, locations, or configurations relative to the well and the food pans to accommodate a variety of sizes and configurations of food pans.

14 Claims, 29 Drawing Sheets

(56) References Cited

U.S. PATENT DOCUMENTS

| | | | | |
|---|---|---|---|---|
| 5,977,521 A * | 11/1999 | Mehta | ............ | A47J 36/24 219/436 |
| 6,196,115 B1 * | 3/2001 | Tsao | ............ | A47J 27/13 126/20 |
| 6,231,910 B1 * | 5/2001 | Ellingsworth | ............ | A21B 3/132 249/119 |
| 7,243,810 B2 * | 7/2007 | O'Brien | ............ | E03B 7/095 220/266 |
| 8,096,443 B2 * | 1/2012 | Mattox | ............ | B65D 21/086 220/788 |
| 8,381,641 B2 * | 2/2013 | Kohl | ............ | A47J 36/24 165/80.3 |
| 8,382,730 B2 * | 2/2013 | Tauer | ............ | A61M 1/0019 206/459.1 |
| 8,853,599 B2 * | 10/2014 | Kusaka | ............ | H05B 6/062 219/622 |
| 8,857,802 B1 * | 10/2014 | Geier | ............ | A47G 19/02 269/9 |
| 9,475,607 B2 * | 10/2016 | Apps | ............ | B65D 11/06 |
| 2004/0083904 A1 * | 5/2004 | Wei-Wen | ............ | A47J 27/04 99/448 |
| 2004/0200364 A1 * | 10/2004 | Mangiapane | ............ | A47J 31/057 99/485 |
| 2006/0091129 A1 | 5/2006 | Colonna | | |
| 2006/0266747 A1 * | 11/2006 | Stolzman | ............ | B65D 19/18 220/4.26 |
| 2007/0175910 A1 * | 8/2007 | Hogarth | ............ | B65F 1/1615 220/835 |
| 2008/0224526 A1 * | 9/2008 | Tsai | ............ | A47C 1/03 297/463.1 |
| 2010/0071567 A1 | 3/2010 | Tosdale et al. | | |
| 2012/0152932 A1 * | 6/2012 | Moon | ............ | H05B 6/062 219/601 |
| 2013/0288108 A1 * | 10/2013 | Chae | ............ | F16M 11/046 429/164 |
| 2014/0157998 A1 | 6/2014 | Roever et al. | | |
| 2014/0339220 A1 * | 11/2014 | Metz | ............ | A47J 36/2483 219/621 |
| 2015/0342398 A1 * | 12/2015 | Andretta | ............ | A47J 36/022 219/387 |
| 2016/0367061 A1 * | 12/2016 | Chou | ............ | A47J 36/2483 |
| 2017/0152074 A1 * | 6/2017 | Park | ............ | B65D 21/0219 |
| 2017/0196402 A1 * | 7/2017 | Kearney | ............ | A47J 36/2405 |

FOREIGN PATENT DOCUMENTS

| | | |
|---|---|---|
| EP | 0635225 B2 | 6/2002 |
| KR | 1261510 | 5/2013 |

* cited by examiner

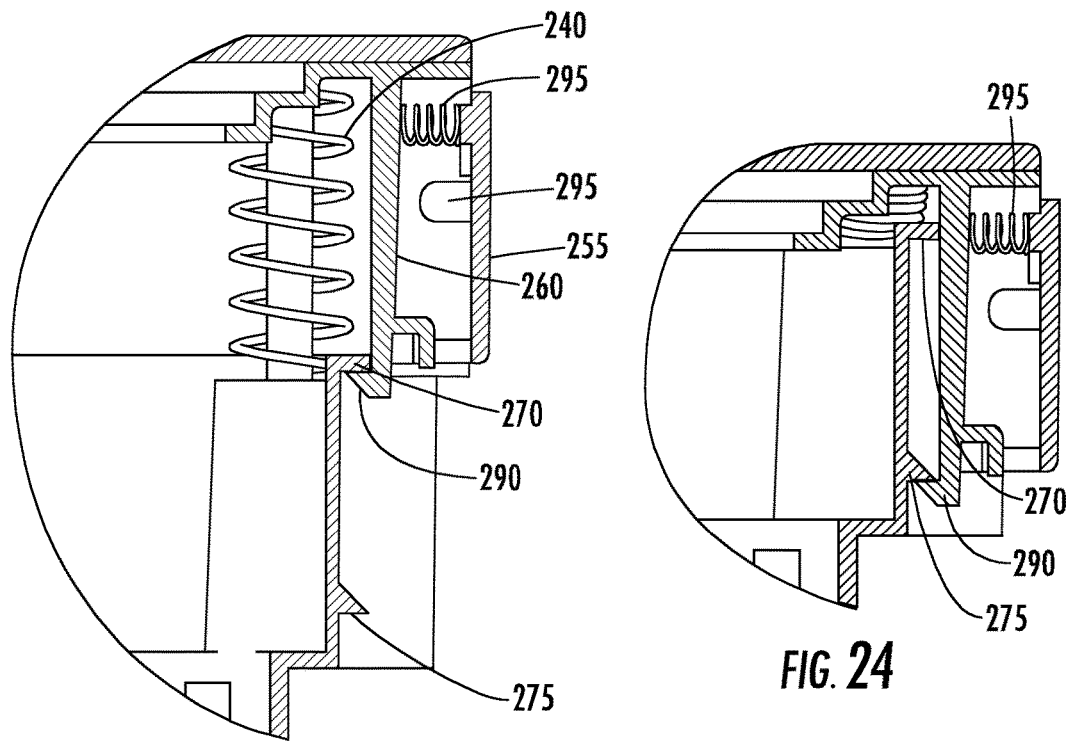
FIG. 23
FIG. 24
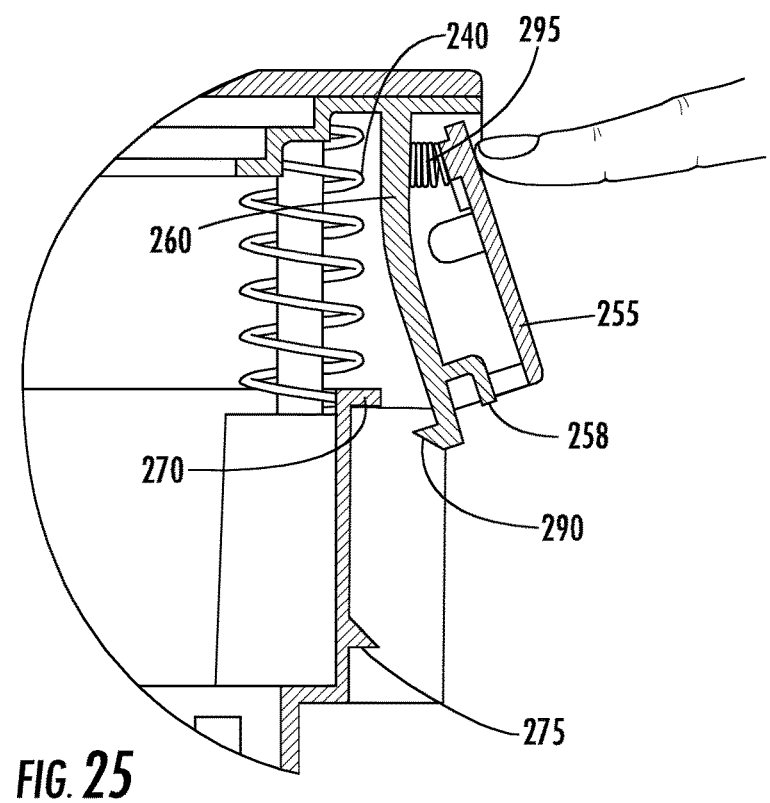
FIG. 25

TEMPERATURE REGULATION DEVICE

BACKGROUND

The present invention relates generally to the field of food service equipment and, in particular, to the field of temperature regulation devices for food service equipment.

Conventional food service equipment supports one or more food pans. The food pans are placed within a well of the food service equipment to warm or maintain the temperature of the food within the food pans. A warming device is typically used in conjunction with the well to maintain the temperature of the food pans for serving purposes (e.g., using steam or radiant heat).

Additionally, conventional food service equipment using induction for heating the food pan may only be able to configured to support one depth of food pan and a user may need to purchase an additional food service setup for a different depth of food pan. For example, the user may have a food pan with a depth of 2½ inches and a food pan with a depth of 4 inches. The user may not easily use both food pans with a single food service setup. Thus, there is a need for adjustable food service equipment to allow for use of food pans with varying depths.

SUMMARY

A temperature regulation device for positioning in a well of food service equipment, the temperature regulation device a housing including a top surface, a bottom surface, a first side, and a second side, wherein the first side includes a first support surface that supports the housing when the housing is positioned in a first position relative to the well, and wherein the second side includes a second support surface that supports the housing when the housing is positioned in a second position relative to the well, wherein the first support surface is spaced apart from the top surface by a first dimension, and the second support surface is spaced apart from the top surface by a second dimension, wherein the first dimension is larger than the second dimension.

An apparatus for positioning in a well of food service equipment for heating a food pan positioned in the well, the apparatus including a housing including an upper portion including a top surface, a lower portion including a bottom surface, an adjustment mechanism coupling the upper portion and the lower portion, the adjustment mechanism including a guide, and a track, wherein the guide is configured to move along the track, thereby changing a distance between the top surface of the upper portion and the bottom surface of the lower portion.

An apparatus for heating a food pan positioned in a well of food service equipment, the apparatus including a top portion including a top surface, a bottom portion including a bottom surface, a first side, a second side opposite the first side, wherein the first side and the second side extend from the bottom surface, a height adjustment mechanism to adjust the spacing between the top surface and the bottom surface, the height adjustment mechanism including a first height catch disposed on the bottom portion, wherein the first height catch is a first distance from the top surface, and a second height catch disposed on the bottom portion, wherein the second height catch is a second distance from the top surface, a first inner member disposed on the top portion of the housing, the first inner member releasably and selectively engages the first height catch or the second height catch, wherein the first inner member is engaged with the first height catch in a first position, and wherein the first inner member is engaged with the second height catch in a second position.

An apparatus for heating a food pan positioned in a well of food service equipment, the apparatus including a top portion having a top surface, a bottom portion having a bottom surface and movable relative to the top portion, a height adjustment mechanism configured to position the top portion in at least a first position and a second position relative to the bottom portion, wherein the first position defines a first dimension between the top surface and the bottom surface and the second position defines a second dimension between the top surface and the bottom surface different than the first dimension, the height adjustment mechanism including an inner member coupled to the top portion, a biasing member configured to bias the top portion relative to the bottom portion, a catch configured to engage with the inner member, and a release mechanism configured to disengage the inner member from the catch.

An apparatus for heating a food pan positioned in a well of food service equipment, the apparatus including a top portion having a top surface, a bottom portion having a bottom surface, an adjustment mechanism, the adjustment mechanism including a first thread portion on the top portion, a second thread portion on the bottom portion engaged with the first thread portion, wherein rotation of the top portion relative to the bottom portion and engagement of the first thread portion with the second thread portion moves the top portion relative to the bottom portion between at least a first position and a second position, wherein the first position defines a first dimension between the top surface and the bottom surface and the second position defines a second dimension between the top surface and the bottom surface different than the first dimension.

Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, in which:

FIG. 23 is a section view of the height adjustment mechanism of the temperature regulation device of FIG. 22 in an upper position, according to an exemplary embodiment;

FIG. 24 is a section view of the height adjustment mechanism of the temperature regulation device of FIG. 22A in a lower position, according to an exemplary embodiment;

FIG. 25 is a view of the height adjustment mechanism of the temperature regulation device of FIG. 21 under user manipulation, according to an exemplary embodiment;

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring to FIGS. 1-12, a temperature regulation device 10 is shown according to an exemplary embodiment. The temperature regulation device 10 is configured to increase, maintain, or regulate the temperature of a food pan containing a food item by heating the food pan to a specified temperature and then maintaining the food pan at that specified temperature (e.g. a warming temperature of 155 degrees Fahrenheit for soup). Different food items may need to be cooked or warmed to different warming temperatures and/or maintained at different temperatures.

Figure 1:
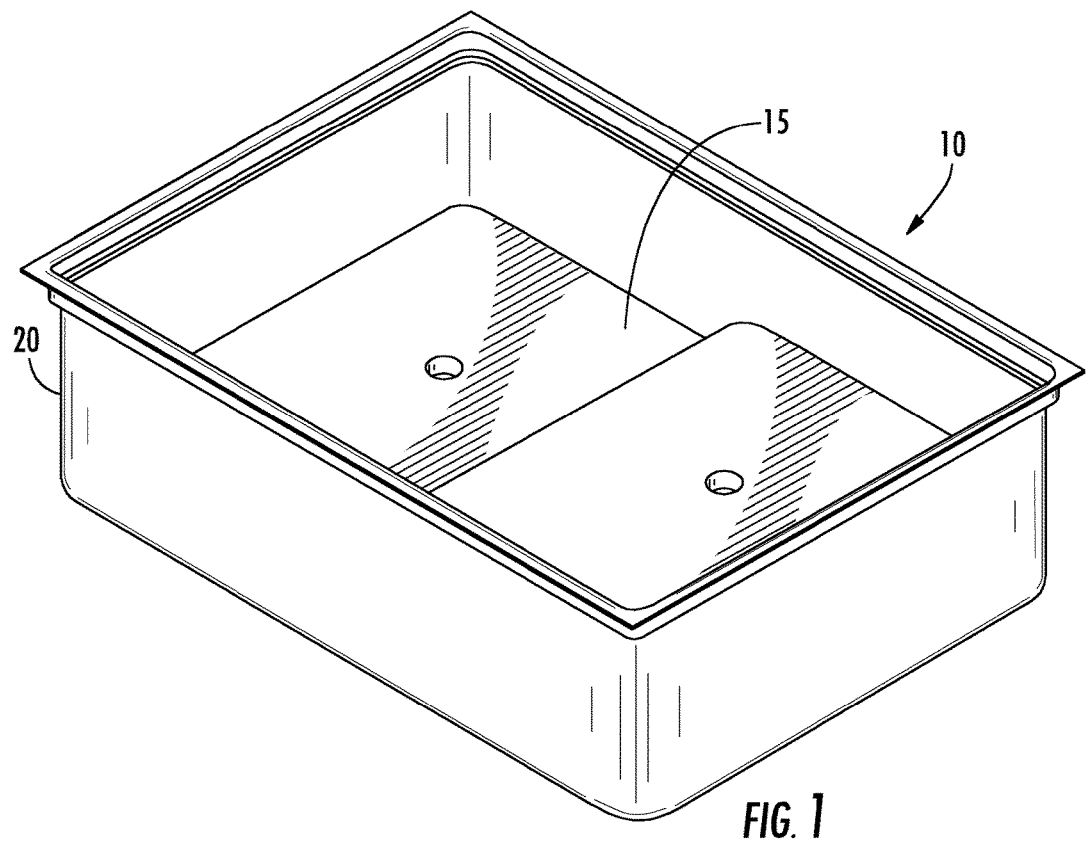
FIG. 1 is a perspective view of a temperature regulation device positioned within a well, according to an exemplary embodiment.
Figure 2:
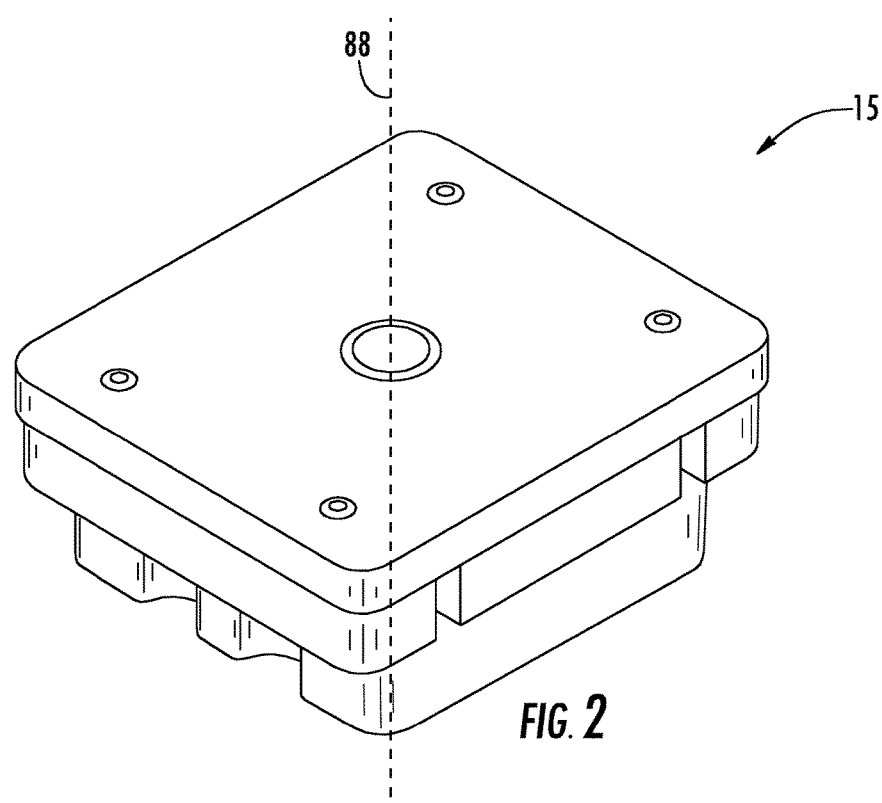
FIG. 2 is a perspective view of a temperature regulation device according to an exemplary embodiment.
Figure 3:
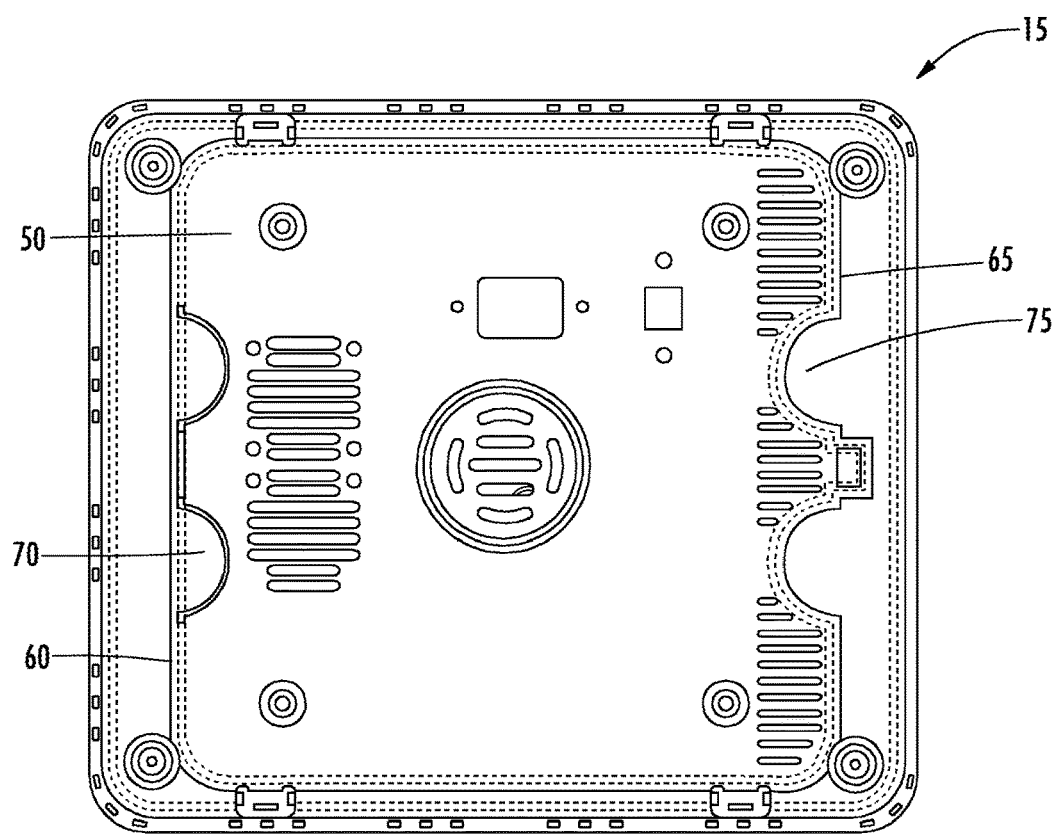
FIG. 3 is a bottom view of the temperature regulation device of FIG. 2, according to an exemplary embodiment.
Figure 7:
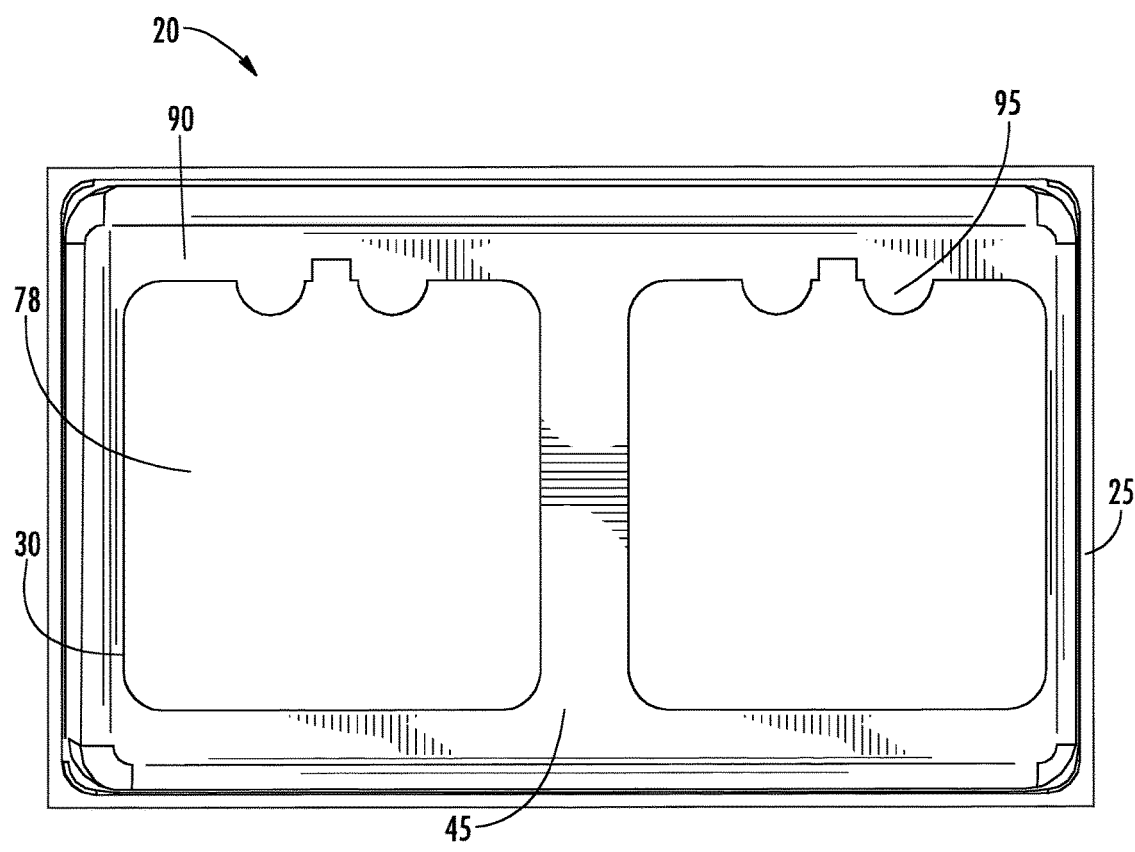
FIG. 7 is a top view of the well in which the temperature regulation device of FIG. 2 is positioned as shown in FIG. 1, according to an exemplary embodiment.

In FIG. 1, the temperature regulation device 10 is shown as a module or pod 15 positioned in a well 20. In some embodiments, one or more pods 15 are positioned within the well 20, allowing temperature maintenance of more than one food pan. As shown in FIG. 7, the well 20 defines an exterior or side wall 25 and a bottom wall 45. The well 20 additionally includes a perimeter 30 shaped to receive the pod 15. The perimeter 30 can be rectangular (as shown in FIG. 7), circular, or other appropriate shapes. In some embodiments, the well 20 is sized to accept a particular size of food pan (e.g., 7-quart, 11-quart food pan, etc.). Additionally, in some embodiments, the well 20 accepts a particular depth of food pan (e.g., 2½-inch, 4-inch food pan, etc.). In these embodiments, the well 20, with the pod 15 positioned in the well 20, is equipped to accept more than one food pan with varying depths due to the pod 15 being adjustable in nature.

The pod 15 is configured to regulate and/or maintain a temperature of a food pan 92 placed within the well 20 for food serving purposes. According to an exemplary embodiment, the pod 15 is an induction device including a thermistor 17 and one or more induction coils. In other embodiments, the pod 15 may be any other warming or temperature regulation device.

Referring now to FIGS. 2-6, the pod 15 includes a housing (e.g., enclosure, etc.) having a bottom surface 50, top surface 55, a first pod side 60, a second pod side 65, and a drainage column 35. The first and second pod sides 60 and 65 are positioned opposite from each other. As shown, the pod 15 additionally includes at least two recesses (e.g., grooves, contours, notches, etc.), shown as first recess 70 and second recess 75. The first and second recesses 70, 75 extend from the bottom surface 50 of the pod 15 toward the top surface 55 and are positioned proximate the first and second pod sides 60, 65, respectively. In some embodiments, the first recess 70 is positioned on a first pod side 60 of the pod 15 opposite from the second recess 75 (positioned on second pod side 65). For example, if the pod 15 is in a rectangular shape, the first recess 70 is positioned on first pod side 60 that is approximately parallel the second pod side 65 of the rectangular shape where the second recess 75 is positioned. In alternative embodiments, the pod 15 may contain more or less recesses than are illustrated in the current embodiment.

The drainage column 35 is formed along a longitudinal axis 88 at the center of the pod 15 extending from the top surface 55 of the pod 15 to the bottom surface 50 of the pod 15. The drainage column 35 allows drainage of liquid from the pod 15 by providing a passageway through the bottom of the pod 15. In some embodiments, the drainage column 35 is cylindrical in shape. In other embodiments, the drainage column 35 is rectangular in shape. In some other embodiments, the drainage column 35 may be any another shape to allow drainage of liquid from the pod 15.

Figure 4:
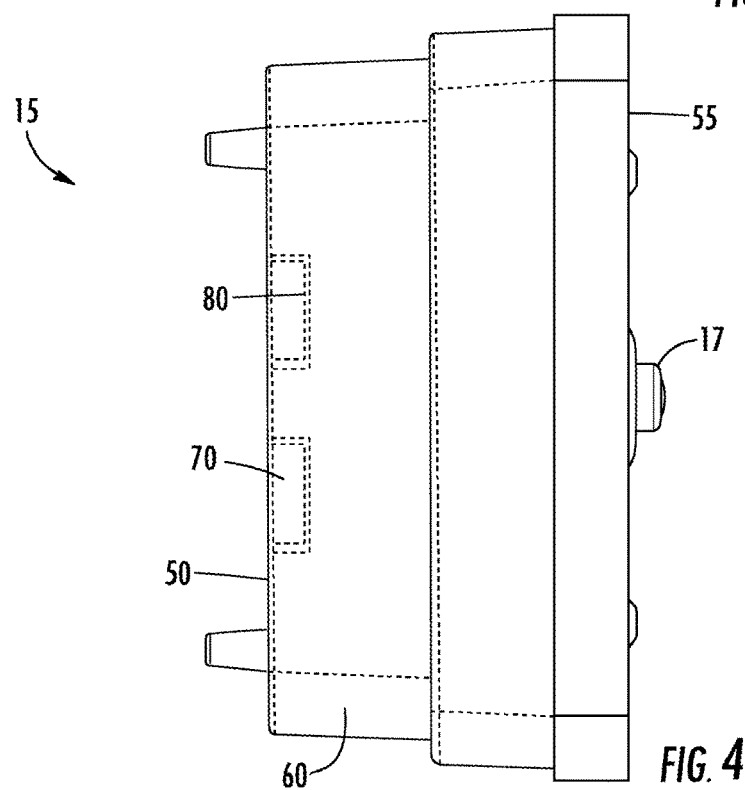
FIG. 4 is a first side view of the temperature regulation device of FIG. 2, according to an exemplary embodiment.
Figure 5:
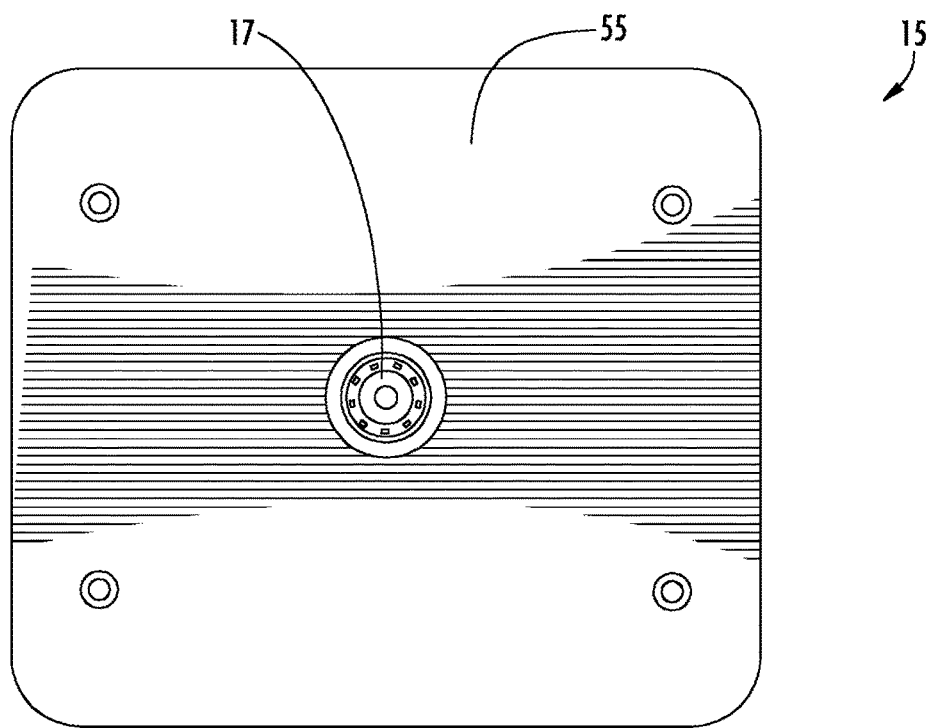
FIG. 5 is a top view of the temperature regulation device of FIG. 2, according to an exemplary embodiment.
Figure 6:
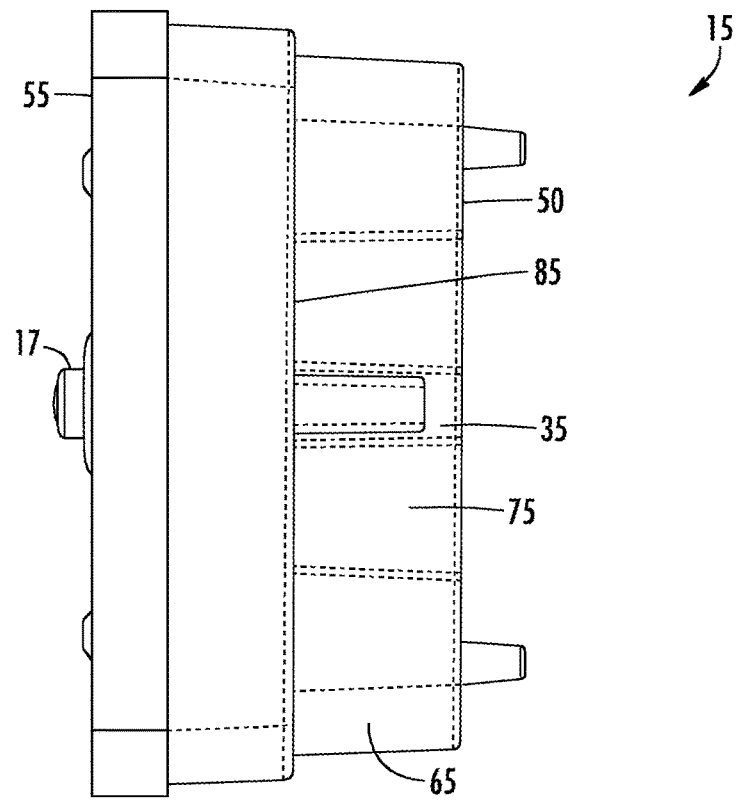
FIG. 6 is a second side view of the temperature regulation device of FIG. 2, according to an exemplary embodiment.

Referring to FIGS. 4 and 6, first and second pod sides 60, 65 of the pod 15 are shown, according to an exemplary embodiment. The first recess 70 includes first support surface 80. The second recess 75 includes second support surface 85. The distance between the first support surface 80 and the top surface 55 of the pod 15 and the distance between the second support surface 85 and the top surface 55 of the pod 15 are different. As shown in FIGS. 4 and 6, the distance between first support surface 80 and the top surface 55 is greater than the distance between the second support surface 85 and the top surface 55 of the pod 15.

Referring now to FIG. 7, the well 20 is shown according to an exemplary embodiment. The well 20 includes an opening 78 (e.g., aperture, cutout, etc.) defining a ledge 90. The ledge 90 is configured to support the pod 15 while positioned within the well 20. In some embodiments, the ledge 90 includes two or more well flanges 95 that protrude into the opening 78 of the well 20. The two or more well flanges 95 are configured to support the pod 15 at the first and second support surfaces 80, 85. In one configuration, the two or more well flanges 95 support the pod 15 at the first support surface 80 included in the first recess 70. In another configuration, the two or more well flanges 95 support the pod 15 at the second support surface 85 included in the second recess 75. These configurations correspond to a variety of positions (e.g., orientations, configurations, etc.) shown as first position 72 and second position 82, respectively, as described further herein.

Figure 9:
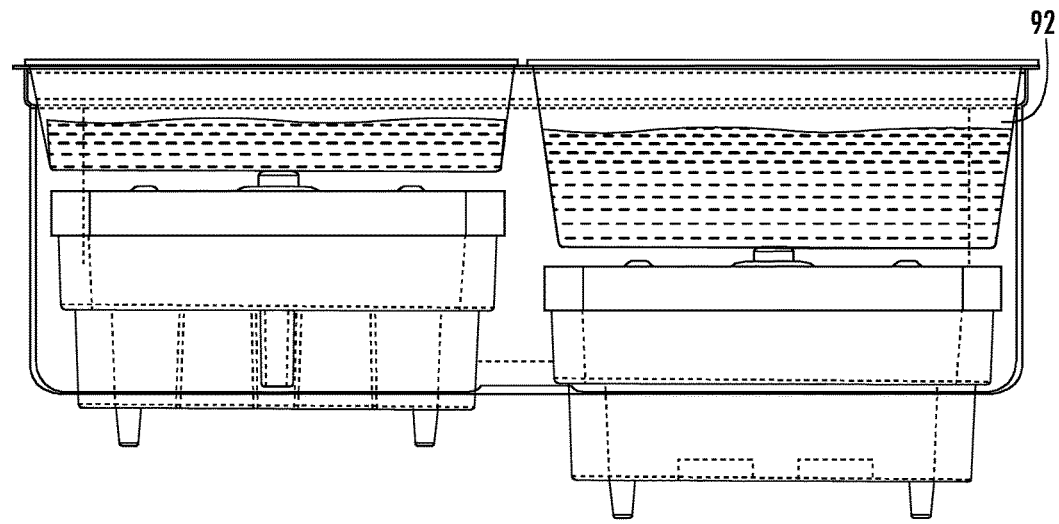
FIG. 9 is a section view of the arrangement in FIG. 8 with food pans inserted, according to an exemplary embodiment.
Figure 10:
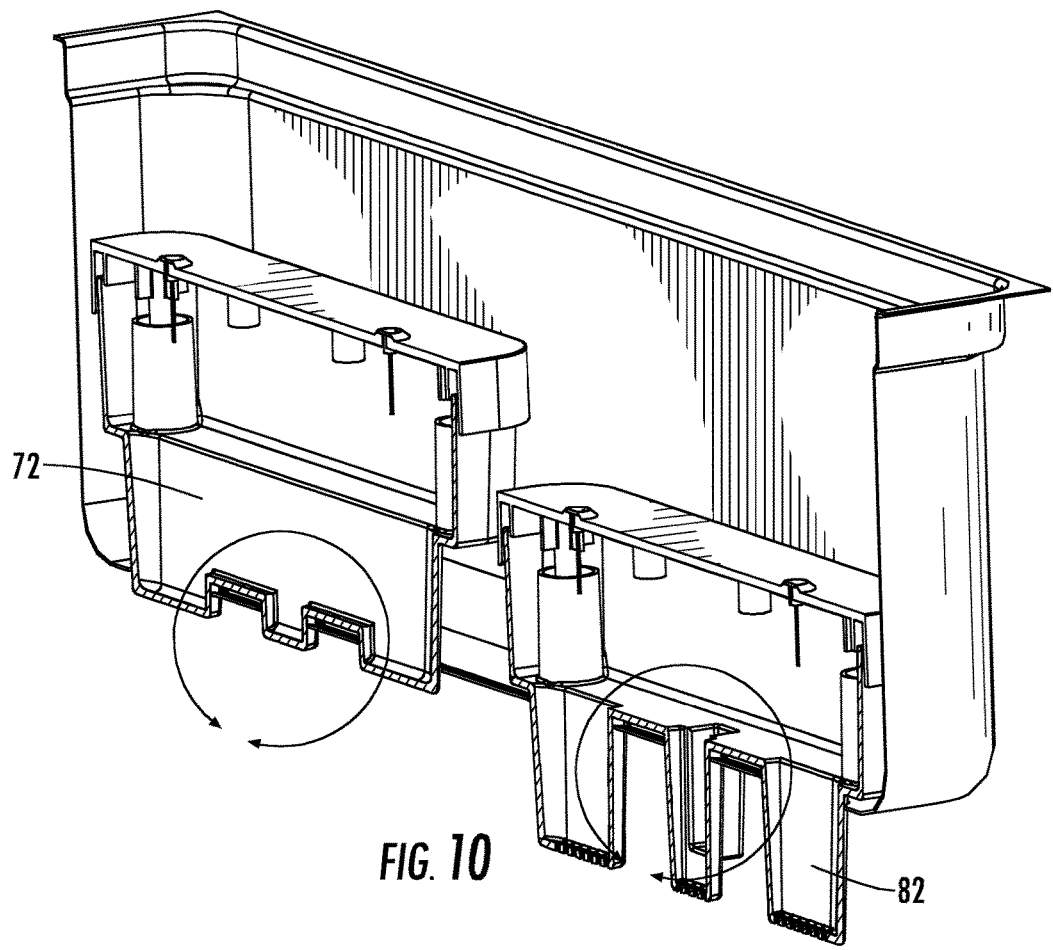
FIG. 10 is a perspective section view of a temperature regulation device positioned within the well in two different positions, according to an exemplary embodiment.
Figure 11:
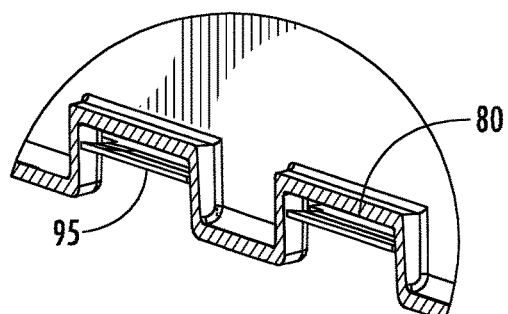
FIG. 11 is a section view of the temperature regulation device of FIG. 10 in a first position, according to an exemplary embodiment.
Figure 12:
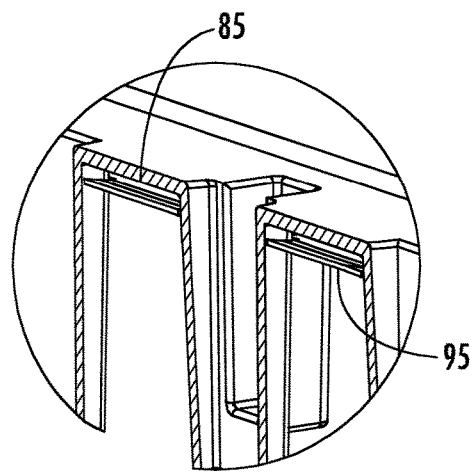
FIG. 12 is a section view of the temperature regulation device of FIG. 10 in a second position, according to an exemplary embodiment.
Figure 13:
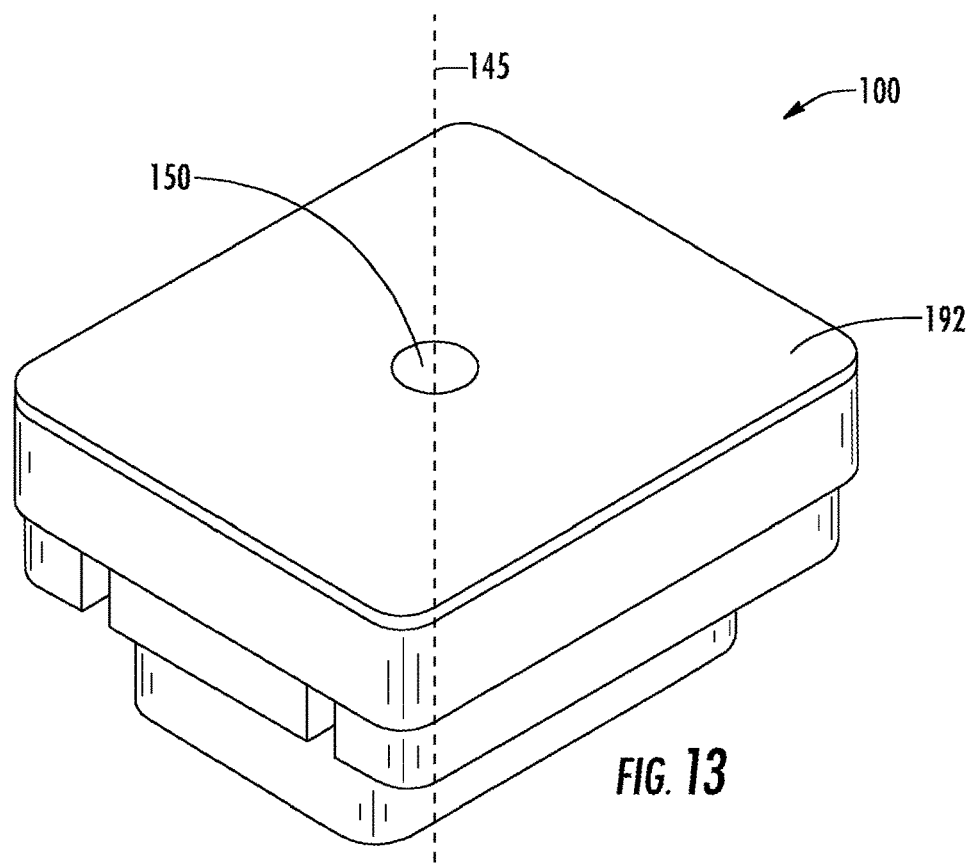
FIG. 13 is a perspective view of a temperature regulation device, according to an exemplary embodiment.
Figure 14:
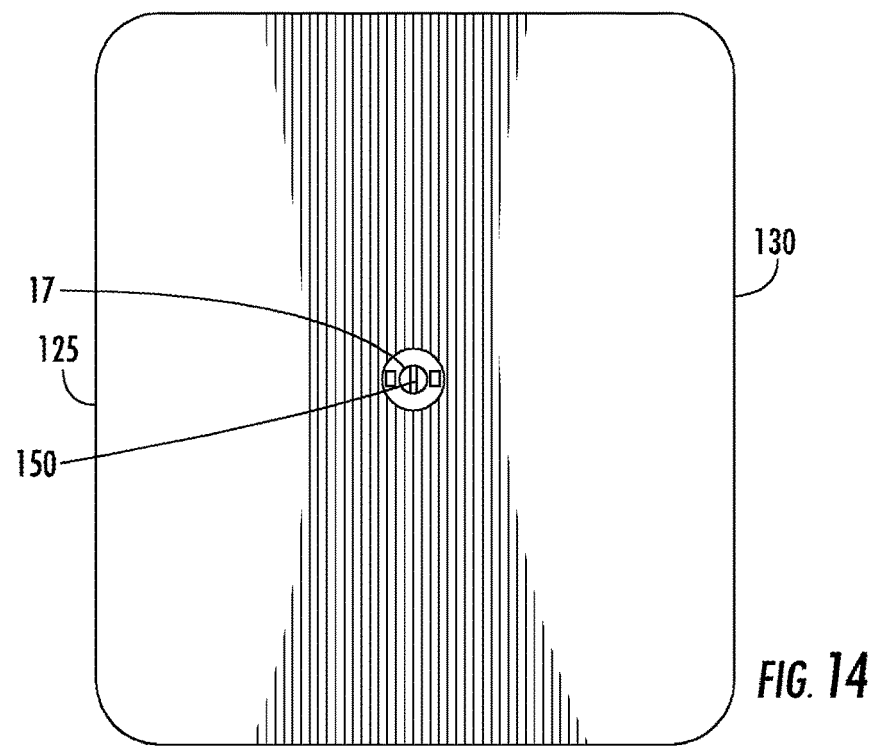
FIG. 14 is a top view of the temperature regulation device of FIG. 13, according to an exemplary embodiment.
Figure 15:
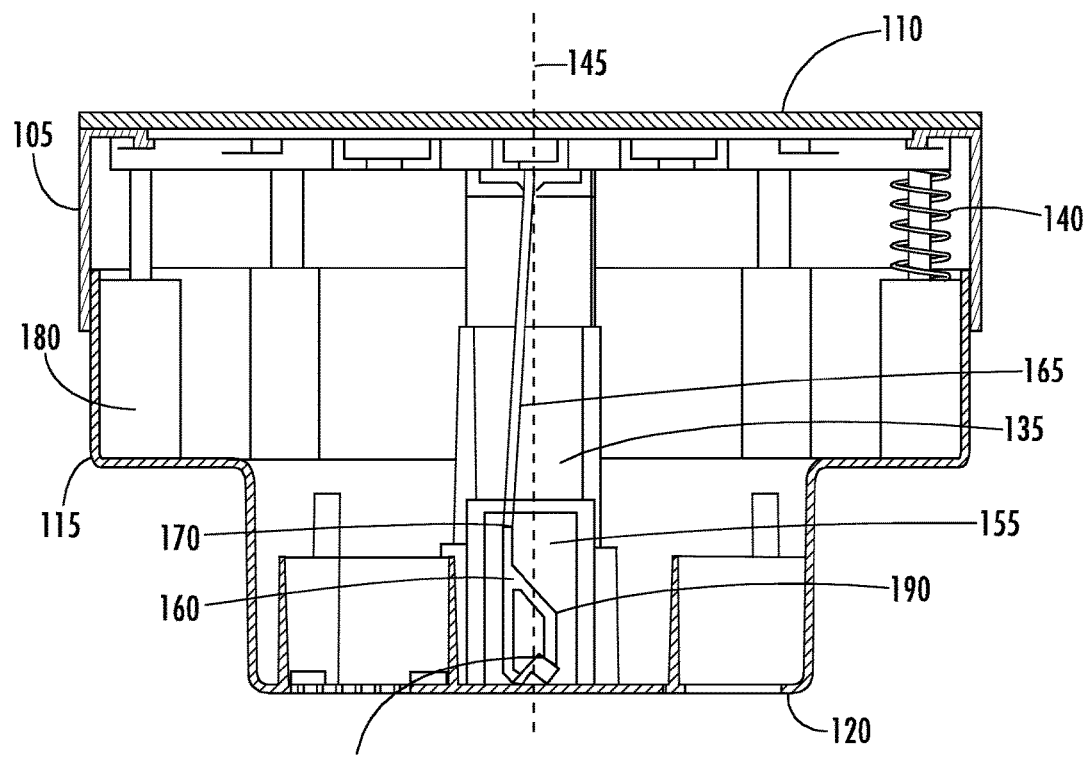
FIG. 15 is a side section view of the temperature regulation device of FIG. 13 in an upper position, according to an exemplary embodiment.
Figure 15A:
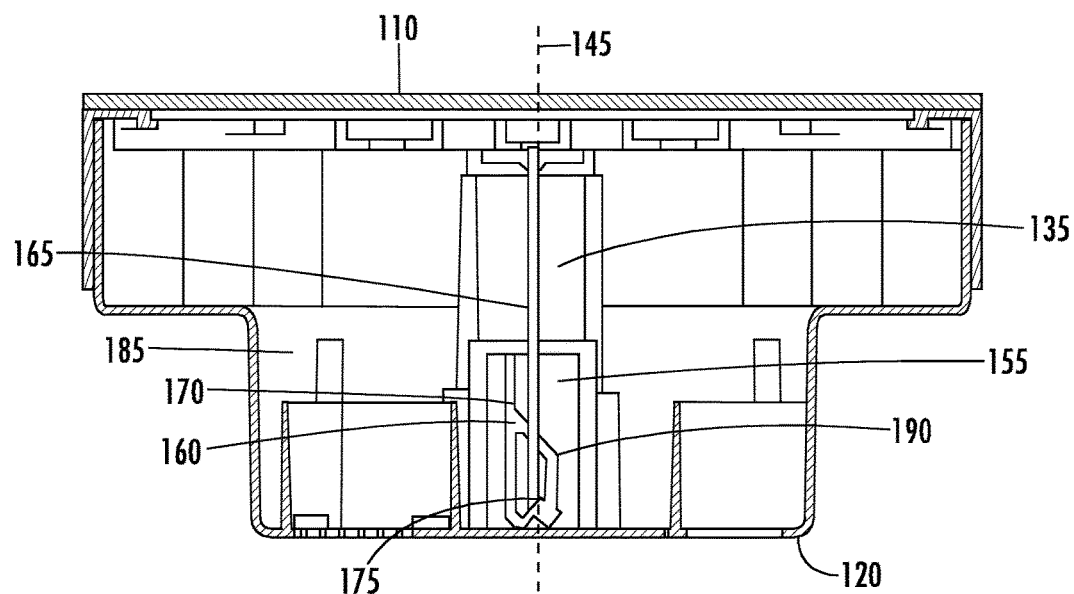
FIG. 15A is a side section view of the temperature regulation device of FIG. 13 in a lower position, according to an exemplary embodiment.
Figure 16:
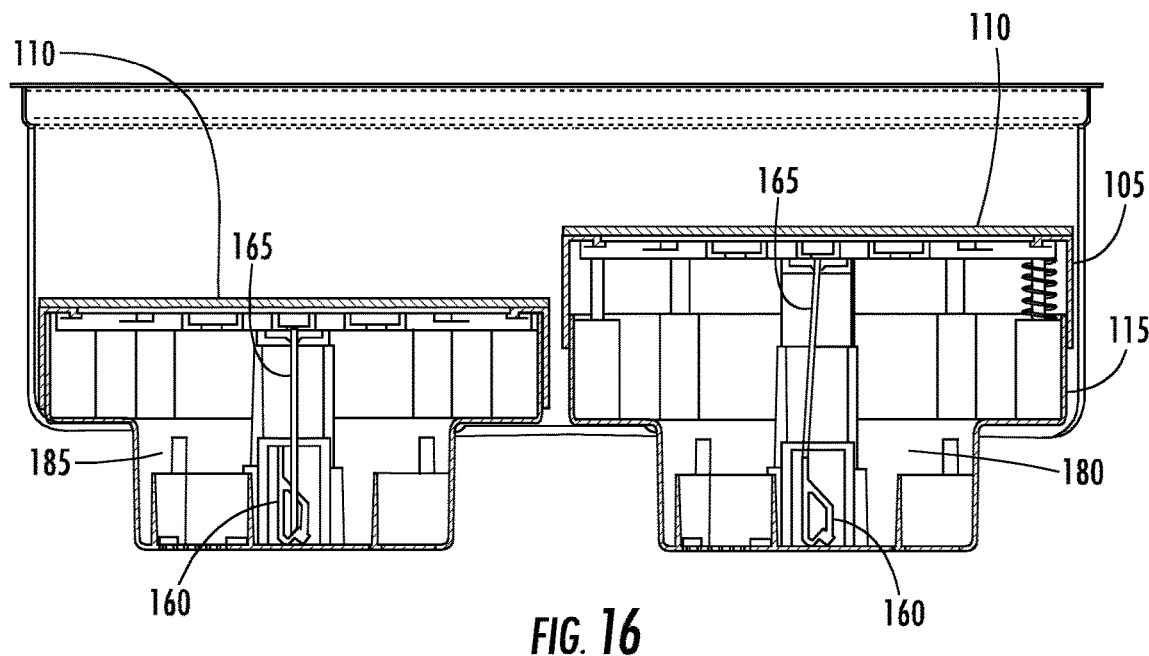
FIG. 16 is a side section view of a temperature regulation device of FIG. 13 positioned within the well in two different positions, according to an exemplary embodiment.
Figure 17:
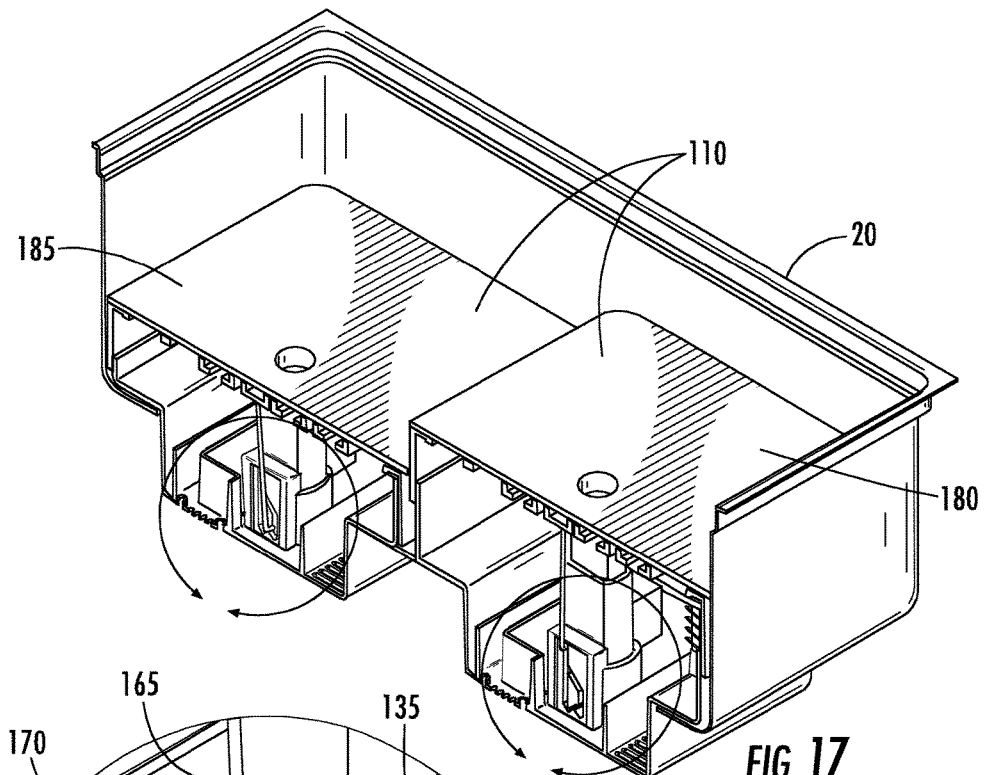
FIG. 17 is a perspective section view of a temperature regulation device of FIG. 13 positioned within the well in two different positions, according to an exemplary embodiment.

Referring now to FIGS. 8-12, as described above, the pod 15 may be positioned within the well 20 in at least two different positions. When the pod 15 is positioned such that the first support surface 80 of the first recess 70 contacts (e.g., engages, rests on, is supported by, etc.) the well flange 95, the pod height within the well 20 is different than when the pod 15 is positioned such that the second support surface 85 of the second recess 75 contacts (e.g., engages, rests on, is supported by, etc.) the well flange 95. In some embodiments, the pod 15 may be positioned in a first position 72 within the well 20. As shown in FIG. 11, when in the first position 72, the pod 15 is supported by the two or more flanges 95 at a first support surface 80 of the first recess 70. In some embodiments, the pod 15 may be positioned in a second position 82 within the well 20. As shown in FIG. 12, when in the second position 82, the pod 15 is supported by the two or more flanges 95 at a second support surface 85 of the second recess 75. Thus, the pod height and/or depth within the well 20 may be changed between two different positions. In particular, the distance between the top surface 55 of the pod 15 and the bottom wall 45 of the well 20 may be changed such that differing depths of food pan may be placed within the well 20.

In an alternative embodiment, if the pod 15 includes more than two recesses, the pod 15 may be positioned in more than two positions. For example, pod 15 may include a third recess (e.g., groove, contour, notch, etc.) extending from the bottom surface 50 of the pod 15 toward the top surface 55 and positioned on a third side of the pod 15. The third recess may include a third support surface such that the third support surface of the third recess contacts (e.g., engages, rests on, is supported by, etc.) the well flange 95. The distance between the third support surface and the top surface 55 of the pod 15 may be different from the same distance with regard to the first and second support surfaces 80, 85. The third recess corresponds to a third position such that when the third recess is in contact with the well flange 95, the pod 15 is in a third position. In other embodiments, the pod 15 includes a fourth recess, and so on.

The pod 15 is configured such that when in the first position 72, the pod 15 may be moved to a second position 82 by a user lifting the pod 15 out of the opening 78, rotating the pod 15 about a vertical axis 88 of the pod 15, and then inserting the pod 15 back into the opening 78. As shown, the vertical axis 88 extends through the center of the pod 15 from the top surface 55 to the bottom surface 50. In some embodiments, the pod 15 is rotated 180 degrees from the first position 72 to the second position 82, or from the second position 82 to the first position 72. In some embodiments, the first position 72 may be used in conjunction with a 2½-inch food pan and the second position 82 may be used in conjunction with a 4-inch food pan.

Figure 8:
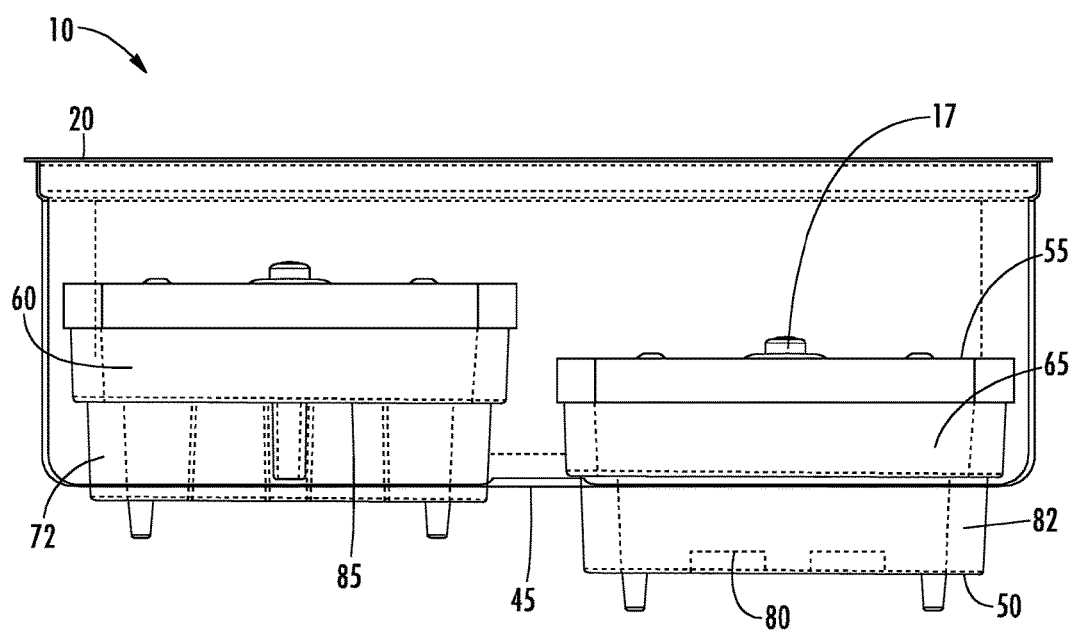
FIG. 8 is a section view of the temperature regulation device of FIG. 2 positioned within the well in two different positions, according to an exemplary embodiment.

As shown in FIGS. 8-10, in some embodiments, more than one pod 15 may be positioned within the well 20. In one embodiment, two pods 15 may be placed in two different configurations where one pod 15 is positioned deeper within the well than the other pod 15 using the support surfaces 80, 85 as described above. As shown in FIG. 9, different depths of food pans 92 may be accommodated in the well 20 at the same time (e.g., a 2½-inch or 4-inch food pan). In other embodiments, the pods 15 may be placed in the same configuration within the well 20.

Referring now to FIGS. 13-20, another embodiment of the temperature regulation device is illustrated. In FIGS. 13-20, the temperature regulation device is shown as a module or pod 100. The pod 100 may be positioned within the well 20 as shown in FIG. 1. The pod 100 includes a housing with a top portion 105 and a bottom portion 115. The top portion 105 includes a top surface 110. The bottom portion 115 includes a bottom surface 120. The pod 100 further includes at least two sides 125 and 130, a drainage column 135, and one or more biasing members 140. The pod 100 additionally includes a height adjustment device, as described further herein. As in the first two embodiments, the at least two sides 125 and 130 are positioned opposite from each other. The drainage column 135 is formed along a longitudinal axis 145 at the center 150 of the pod 100 extending from the top surface 110 of the pod 100 to the bottom surface 120 of the pod 100. The drainage column 135 allows drainage of liquid from the pod 100 by providing a passageway through the bottom portion 115 of the pod 100. In some embodiments, the drainage column 135 is cylindrical in shape. In other embodiments, the drainage column 135 is rectangular in shape. In some other embodiments, the drainage column 135 may be any another shape to allow drainage of liquid from the pod 100.

The biasing members 140 extend between the top surface 110 and the bottom surface 120 and are approximately parallel to the longitudinal axis 145 at the center 150 of the pod 100. In some embodiments, if the pod 100 is rectangular or square in shape, the biasing members 140 are positioned in one or more corners 192 of the pod 100. The biasing members 140 bias the top portion 105 relative (e.g., away from, upward, etc.) to the bottom portion 115. In some embodiments, the biasing members 140 are springs. In other embodiments, the biasing members 140 are other resilient members configured to maintain tension between the top portion 105 and the bottom portion 115.

Figure 18:
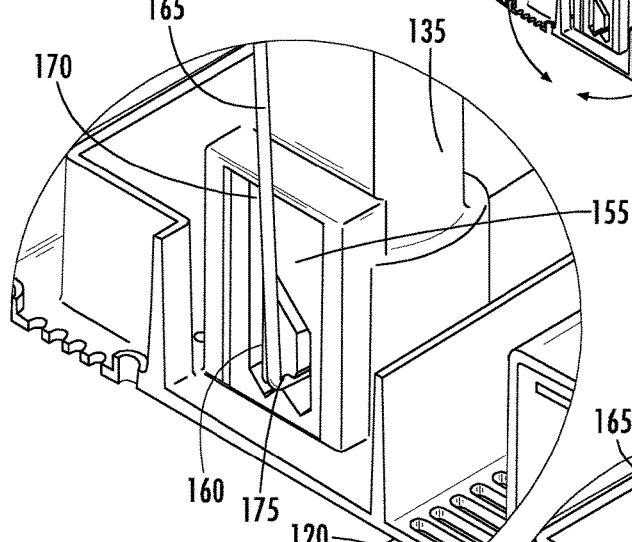
FIG. 18 is a perspective section view of a temperature regulation device of FIG. 13 positioned within the well in a lower position, according to an exemplary embodiment.
Figure 19:
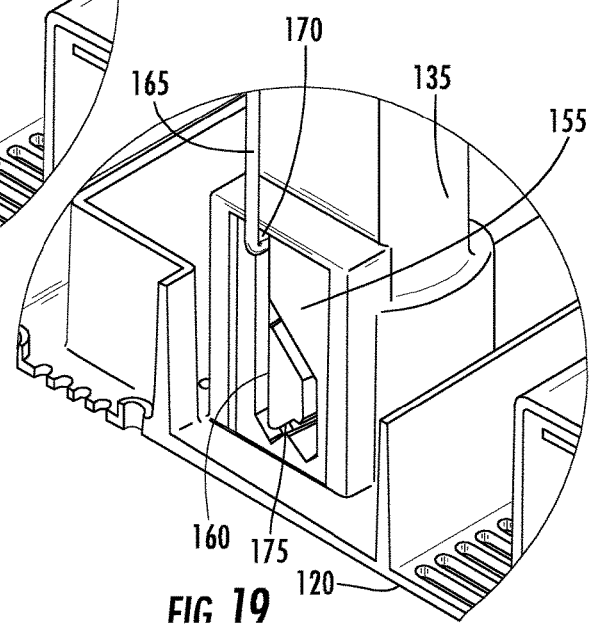
FIG. 19 is a perspective section view of a temperature regulation device of FIG. 13 positioned within the well in an upper position, according to an exemplary embodiment.
Figure 20:
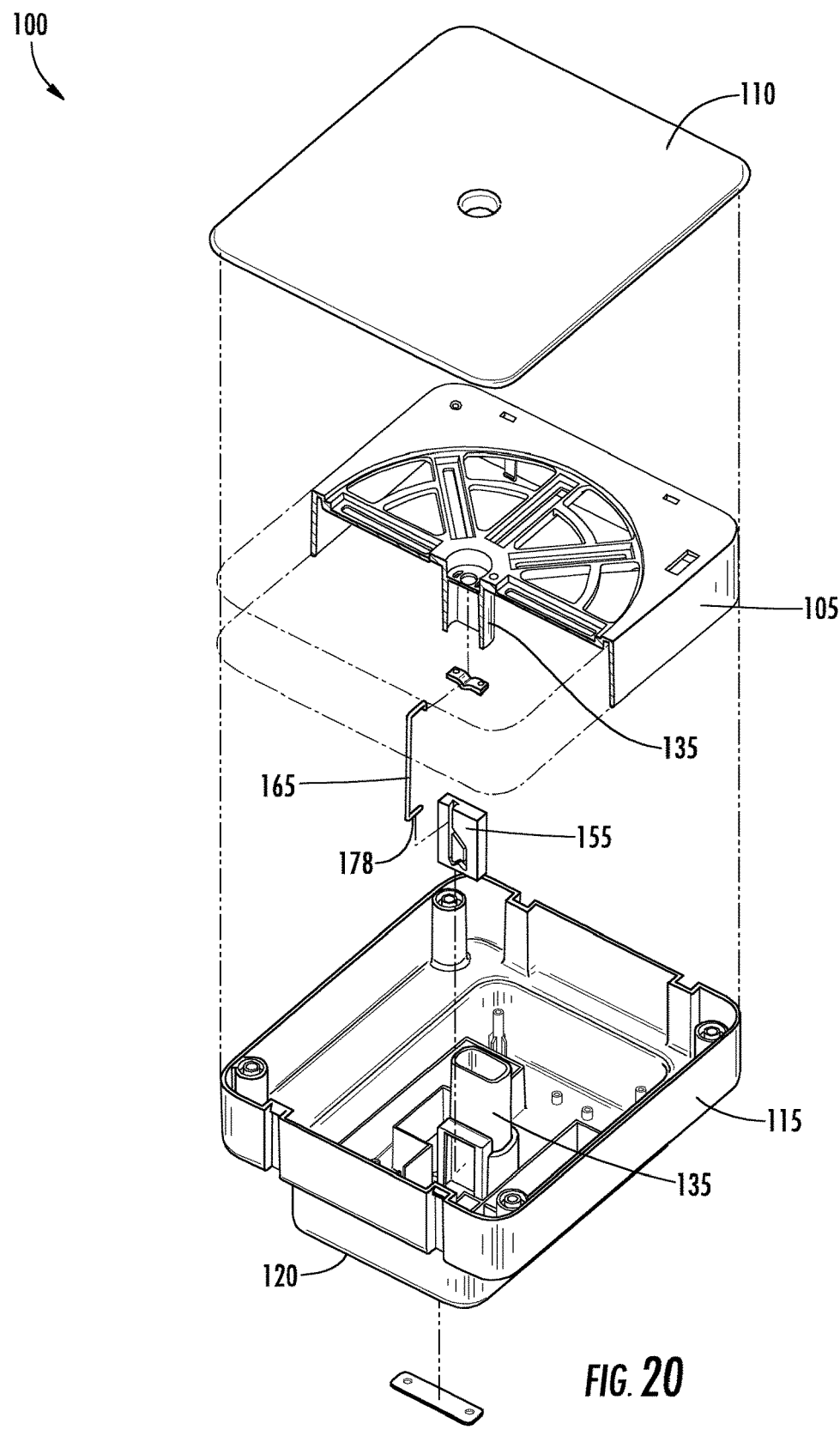
FIG. 20 is an exploded view of the temperature regulation device of FIG. 13, according to an exemplary embodiment.
Figure 21:
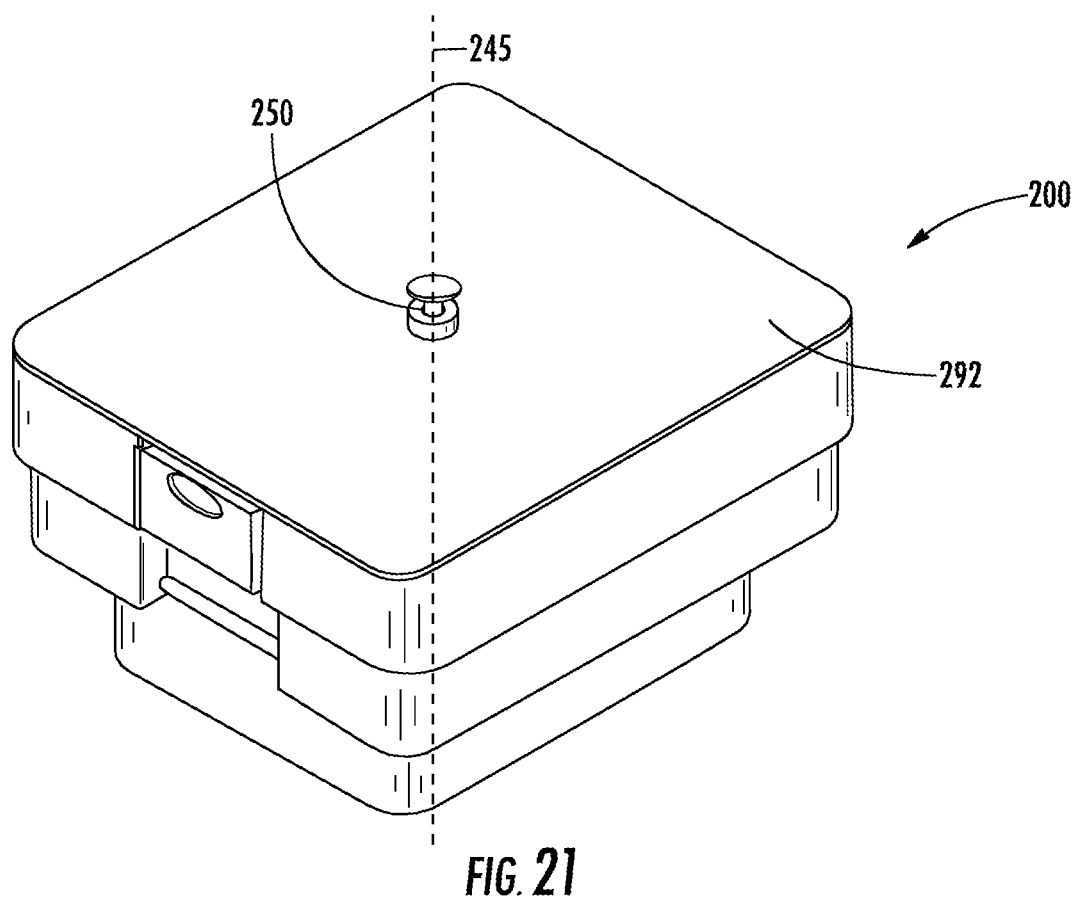
FIG. 21 is a perspective view of a temperature regulation device, according to an exemplary embodiment.

As shown in FIGS. 15-20, the height adjustment device includes the biasing members 140, a track 160, and a guide member (shown and referred to as guide 165). The track 160 is formed in a guide block 155 formed on the drainage column 135 and proximate the bottom surface 120 of the pod 100. The track 160 further includes a top catch 170 and a notch 175. In some embodiments, the guide 165 is a rigid elongated member (e.g., rod, wire, etc.) including one end fixed to the top portion 105 of the pod 100 and the other end (e.g., a pin end 178) extends into the track 160, where the guide 165 is slidably engaged with the track 160. As shown in FIGS. 18 and 19, the pin end 178 may be a bent portion of the guide 165 that extends into the track 160 and rides along the walls of the track 160. As such, the guide 165 moves along the track 160 thereby moving the top surface 110 to different heights relative to the bottom surface 120. In different positions of the pod 100, the guide 165 extends to a corresponding position within the track 160.

Referring to FIGS. 15-19, in an upper position 180, the guide 165 is in contact with the top catch 170 of the track 160 (as shown in FIG. 19). In a lower position 185, the guide 165 is in contact with the notch 175 of the track 160 (shown in FIG. 18). As the guide 165 is moved between the upper position 180 and the lower position 185, and between the top catch 170 and the notch 175 of the track 160, respectively, the top surface 110 of the pod 100 moves nearer the bottom surface 120 of the pod 100. The notch 175 holds the guide 165 in the lower position 185, such that the pod 100 maintains a lower position 185 until the top surface 110 of the pod 100 is pressed downward toward the bottom surface 120 and the guide 165 is released from the notch 175. When the guide 165 is released from the notch 175, the guide 165 follows the angled portion 190 of the track 160 back up to the top catch 170, where the guide 165 is maintained in an upper position 180.

To move the pod 100 between the upper position 180 and the lower position 185, a user presses on the top surface 110 of the pod 100. When the top surface 110 of the pod 100 is pressed in a downward direction (e.g., from top surface 110 to bottom surface 120 of the pod 100), the guide 165 slides along track 160 and the pod 100 moves from an upper position 180 to a lower position 185. As noted above, the pod 100 reaches a lower position 185 when the guide 165 is engaged with the notch 175.

Referencing the first embodiment as shown in FIGS. 8-10, the upper position 180 may be analogous to the first position 72 and additionally, the lower position 185 may be analogous to the second position 82. In some embodiments, the upper position 180 may be used in conjunction with a 2½-inch food pan and the lower position 185 may be used in conjunction with a 4-inch food pan.

Referring now to FIGS. 21-28, yet another embodiment of the temperature regulation device is illustrated. In FIGS. 21-28, the temperature regulation device is shown as module or pod 200. The pod 200 may be positioned within the well 20 as shown in FIG. 1. The pod 200 includes a housing with a top portion 205 and a bottom portion 215. The top portion 205 includes a top surface 210. The bottom portion 215 includes a bottom surface 220. The pod 200 further includes at least two sides 225 and 230, a drainage column 235, and one or more biasing members 240. Similar to the first two embodiments, the two sides 225 and 230 are positioned opposite from each other. The drainage column 235 is formed along a longitudinal axis 245 at the center 250 of the pod 200 extending from the top surface 210 of the pod 200 to the bottom surface 220 of the pod 200. The drainage column 235 allows drainage of liquid from the pod 200 by providing a passageway through the bottom portion 215 of the pod 200. In some embodiments, the drainage column 235 is cylindrical in shape. In other embodiments, the drainage column 235 is rectangular in shape. In some other embodiments, the drainage column 235 may be any another shape to allow drainage of liquid from the pod 200.

As shown, the pod 200 additionally includes one or more outer members 255, one or more inner members 260, an upper catch 270, and a lower catch 275. The outer members 255 are coupled to the top portion 205 of the pod 200 on each side 225 and 230 of the pod 200. The inner members 260 are additionally coupled to the top portion 205 of the pod 200 on each side 225 and 230 of the pod 200. The inner members 260 are further coupled to the outer members 255 via a locking mechanism 258. The locking mechanism 258 fixes the inner members 260 to the outer members 255. In some embodiments, the locking mechanism 258 includes a hooking feature to engage the outer members 255. The inner members 260 are positioned nearer the longitudinal axis 245 at the center 250 of the pod 200 than the outer members 255. The upper catch 270 and lower catch 275 are disposed on the bottom portion 215 of the pod 200. The upper catch 270 is positioned nearer the top surface 210 of the pod 200. The lower catch 275 is positioned nearer the bottom surface 220 of the pod 200.

Figure 22:
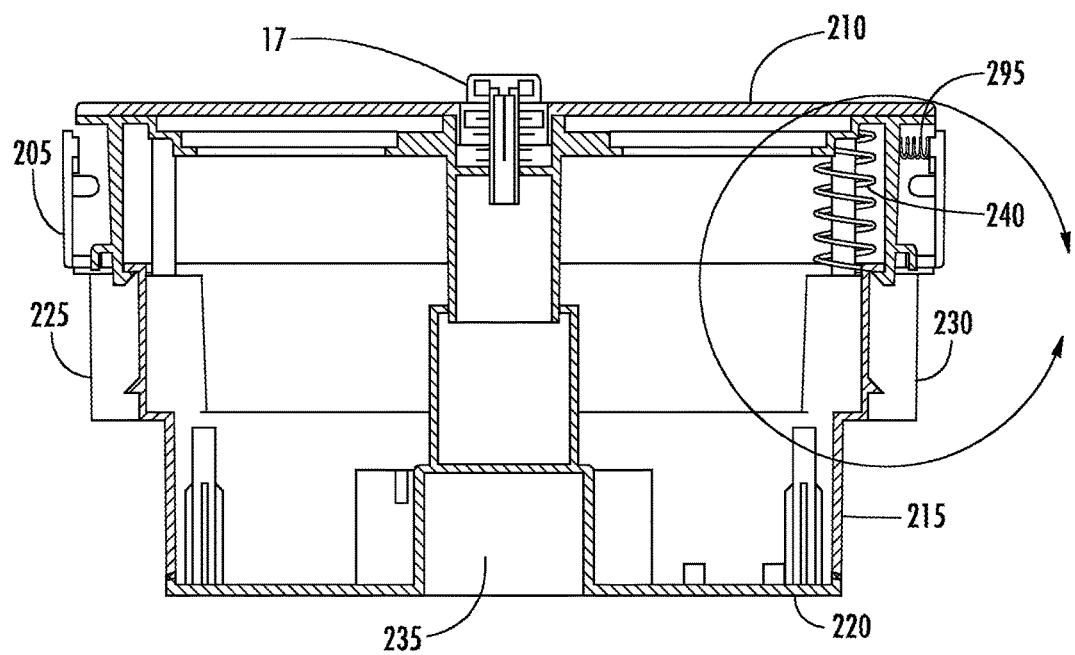
FIG. 22 is a section view of the temperature regulation device of FIG. 21 in an upper position, according to an exemplary embodiment.
Figure 22A:
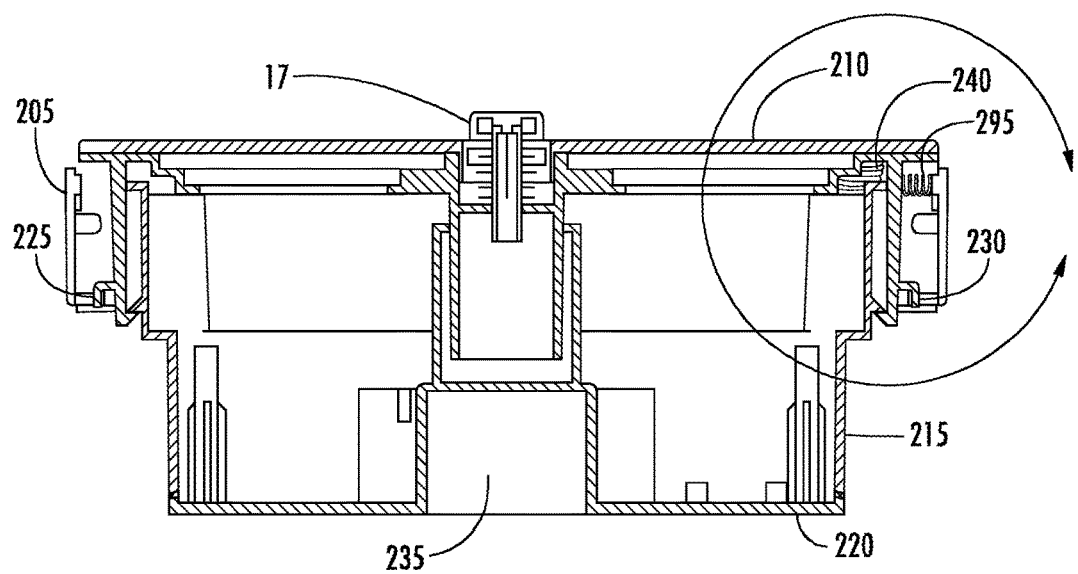
FIG. 22A is a section view of the temperature regulation device of FIG. 21 in a lower position, according to an exemplary embodiment.
Figure 26:
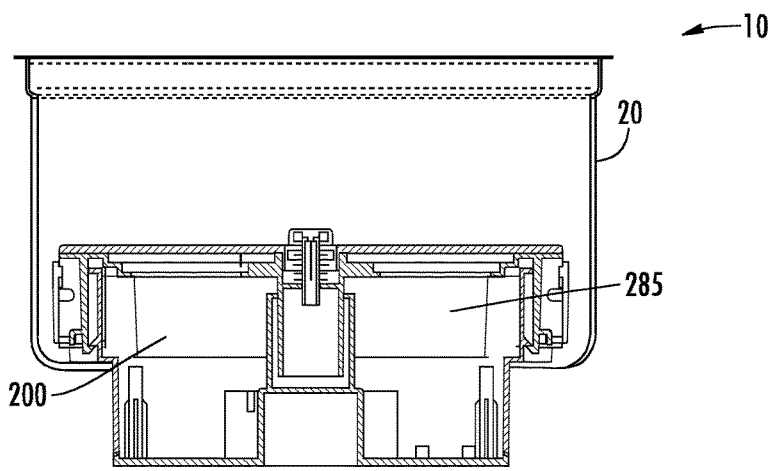
FIG. 26 is a section view of the temperature regulation device of FIG. 21 in a lower position, according to an exemplary embodiment.
Figure 27:
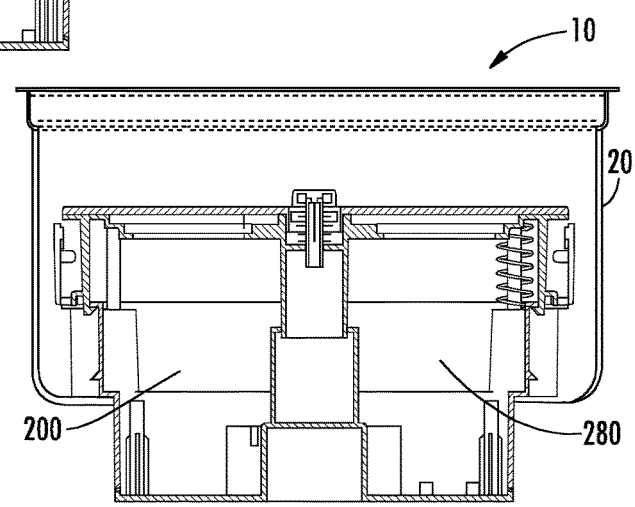
FIG. 27 is a section view of the temperature regulation device of FIG. 21 in an upper position, according to an exemplary embodiment.
Figure 28:
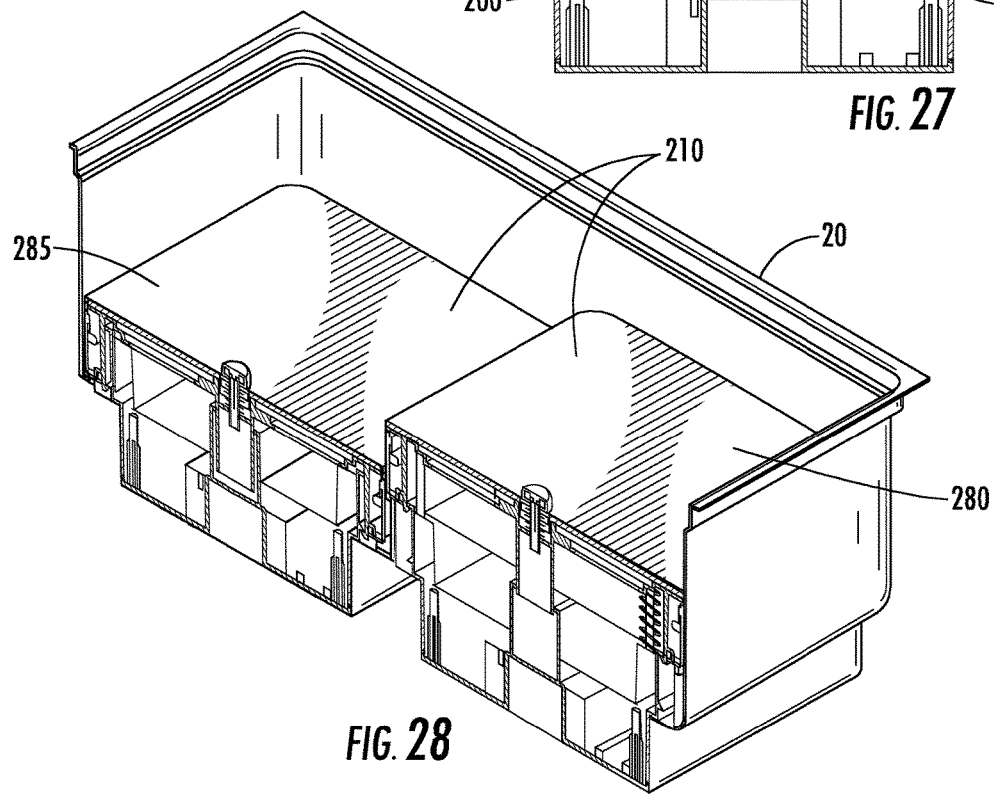
FIG. 28 is a perspective section view of the temperature regulation device of FIG. 21 positioned within the well in two different positions, according to an exemplary embodiment.
Figure 29:
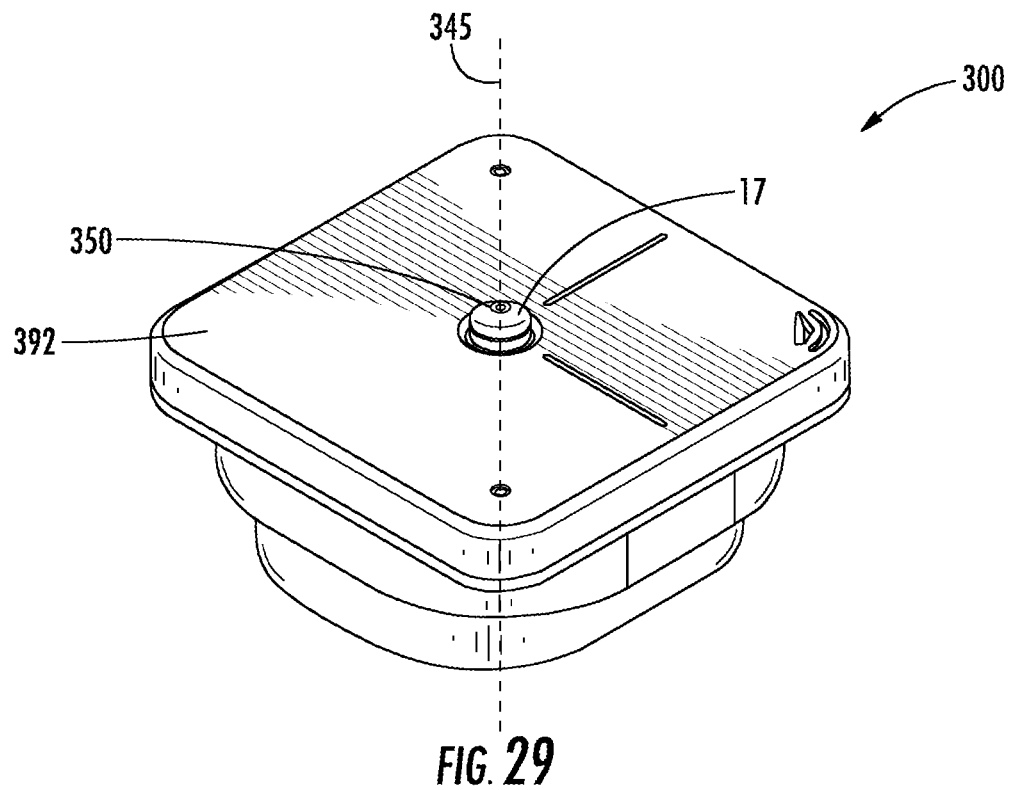
FIG. 29 is a perspective view of a temperature regulation device, according to an exemplary embodiment.
Figure 30:
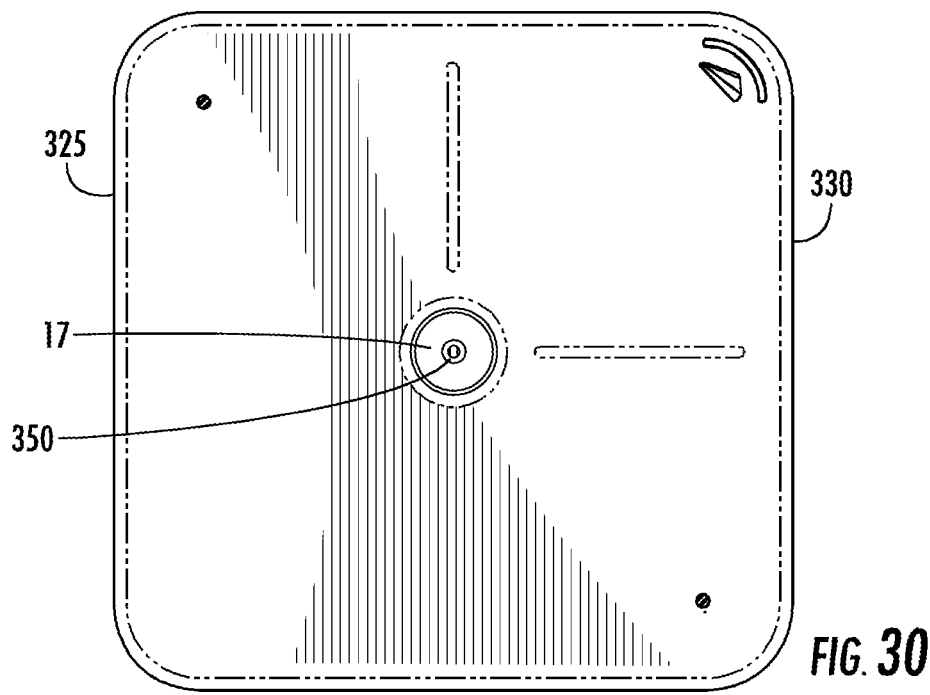
FIG. 30 is a top view of the temperature regulation device of FIG. 29, according to an exemplary embodiment.

As shown in FIGS. 22-22A, in an upper position 280, the inner member 260 is in contact (e.g., engaged, locked, coupled, etc.) with the upper catch 270. In a lower position 285, the inner member 260 is in contact (e.g., engaged, locked, coupled, etc.) with the lower catch 275. The inner members 260 include an overhang 290 coupling the inner member 260 to the upper catch 270 when the pod 200 is in an upper position 280 and to the lower catch 275 when the pod 200 is in a lower position 285.

The biasing members 240 extend between the top surface 210 and the bottom surface 220 and are approximately parallel to the longitudinal axis 245 at the center 250 of the pod 200. In some embodiments, if the pod 200 is rectangular or square in shape, the biasing members 240 may be positioned in one or more corners 292 of the pod 200. The biasing members 240 bias the top portion 205 relative (e.g., away from, upward) to the bottom portion 215. In some embodiments, the biasing members 240 are springs. In other embodiments, the biasing members 240 are other resilient members configured to maintain tension between the top portion 205 and the bottom portion 215.

As shown in FIG. 25, in an upper position 280, when the outer members 255 are pressed inward, the lateral biasing member 295 depresses the inner member 260 and moves the overhang 290 of the inner member 260 away from the upper catch 270. Similarly, in a lower position 285, when the outer members 255 are pressed inward, the lateral biasing member 295 depresses the inner member 260 and moves the overhang 290 of the inner member 260 away from the lower catch 275.

To move the pod 200 from the upper position 280 to the lower position 285, a user presses (or depresses) on the top surface 210 of the pod 200. When the top surface 210 of the pod 200 is pressed in a downward direction (e.g., from top surface 210 to bottom surface 220 of the pod 200), the overhang 290 of the inner member 260 engages the lower catch 275 and the pod 200 is then in a lower position 285. Further as shown in FIG. 25, to move the pod 200 from the lower position 285 to the upper position 280, a user presses (or depresses) on the outer members 255 to cause the lateral biasing member 295 to depress the inner members 260 and move the overhang 290 of the inner member 260 away from the lower catch 275.

Referencing the first embodiment shown in FIGS. 8-10, the upper position 280 may be analogous to the first position 72 and additionally, the lower position 285 may be analogous to the second position 82. Additionally, the lower catch 275 may be analogous to the notch 175 from the previous embodiment such that when the pod 200 is in a lower position 285 the lower catch 275 is configured to maintain the pod 200 in a lower position 285. Similarly, the upper catch 270 may be analogous to the top catch 170 from the previous embodiment such that when the pod 200 is in an upper position 280 the upper catch 270 is configured to maintain the pod 200 in an upper position 280. In some embodiments, the upper position 280 may be used in conjunction with a 2½-inch food pan and the lower position 285 may be used in conjunction with a 4-inch food pan.

Referring now to FIGS. 29-38, yet another embodiment of the temperature regulation device is illustrated. In FIGS. 29-38, the temperature regulation device is shown as module or pod 300. The pod 300 includes an adjustment mechanism or feature so it can be selectively positioned within the well 20 as shown in FIG. 1. The pod 300 includes a housing with a top surface 310 and a bottom surface 320. The pod 300 further includes at least two sides 325 and 330 and a drainage column 335. As shown, the pod 300 additionally includes at least two support surfaces, shown as a first support surface 370 and a second support surface 375. The first and second support surfaces 370, 375 extend from the bottom surface 320 of the pod 300 toward the top surface 310. In alternative embodiments, the pod 300 may contain more or less support surfaces than are illustrated in the current embodiment.

Figure 31:
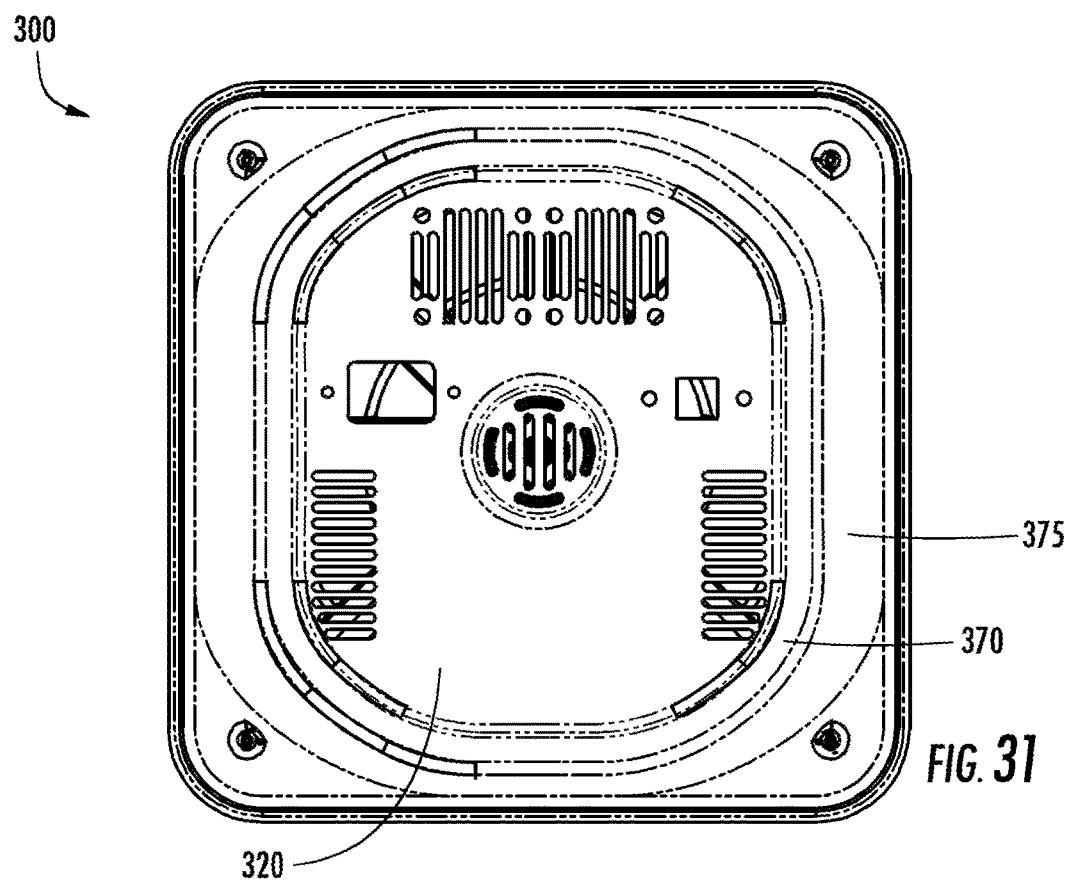
FIG. 31 is a bottom view of the temperature regulation device of FIG. 29, according to an exemplary embodiment.
Figure 32:
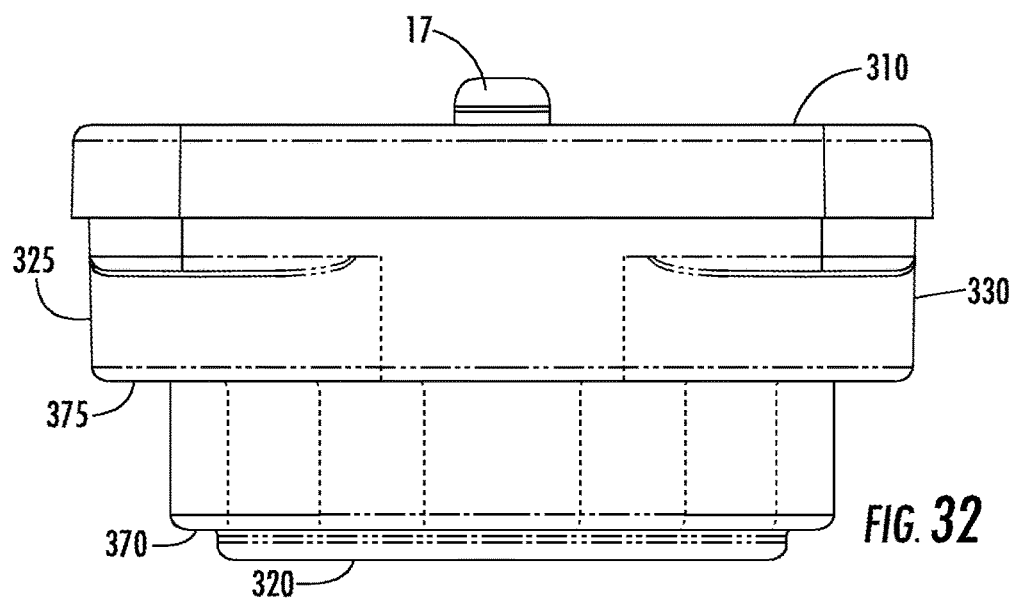
FIG. 32 is a side view of the temperature regulation device of FIG. 29, according to an exemplary embodiment.

Referring to FIGS. 31-32, bottom and side views of the pod 300 are shown, according to an exemplary embodiment. As shown, the distance between the first support surface 370 and the top surface 310 of the pod 300 and the distance between the second support surface 375 and the top surface 310 of the pod 300 are different. As shown in FIG. 32, the distance between first support surface 370 and the top surface 310 is greater than the distance between the second support surface 375 and the top surface 310 of the pod 300.

Figure 33:
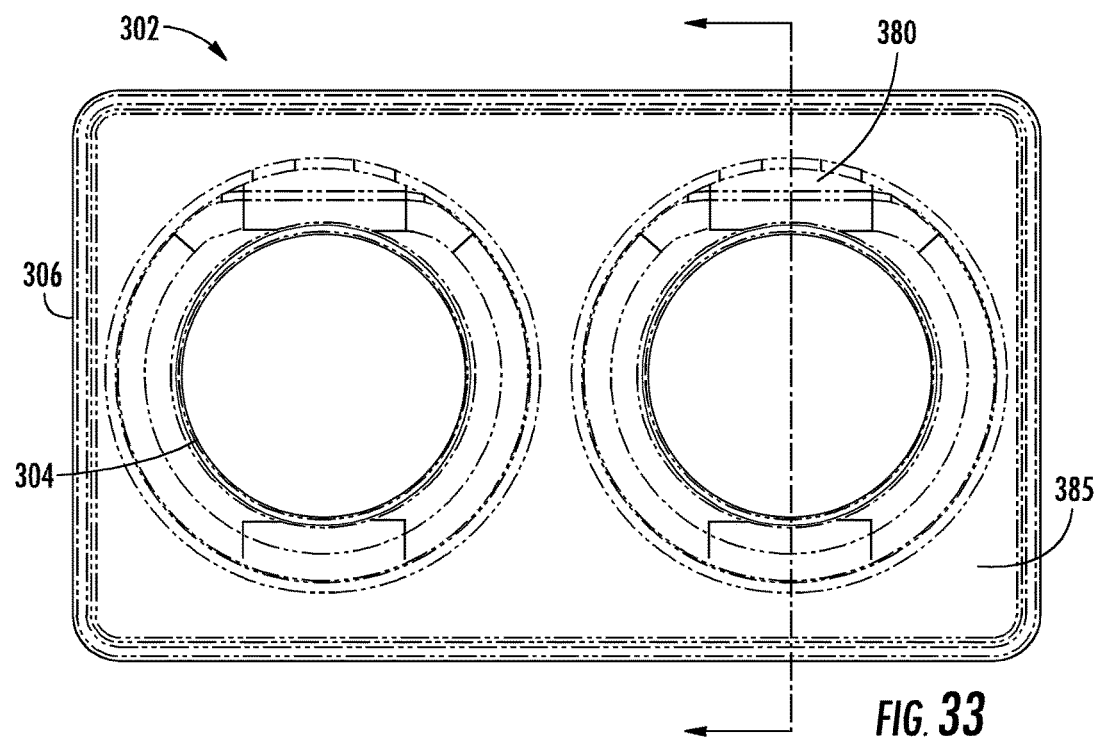
FIG. 33 is a top view of a receptacle of the temperature regulation device of FIG. 29, according to an exemplary embodiment.
Figure 34:
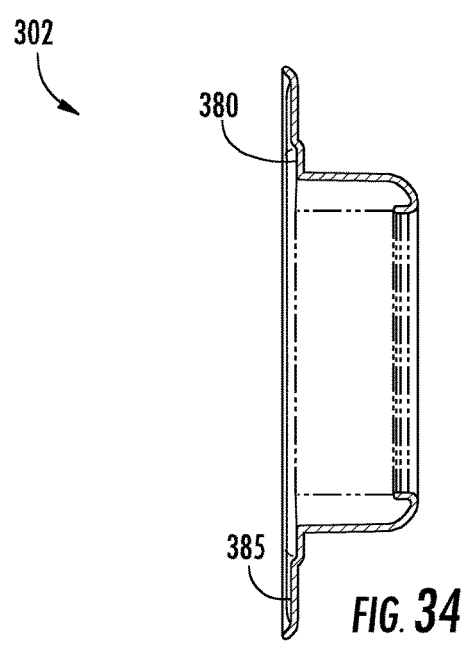
FIG. 34 is a section view of the receptacle of FIG. 33, according to an exemplary embodiment.
Figure 35:
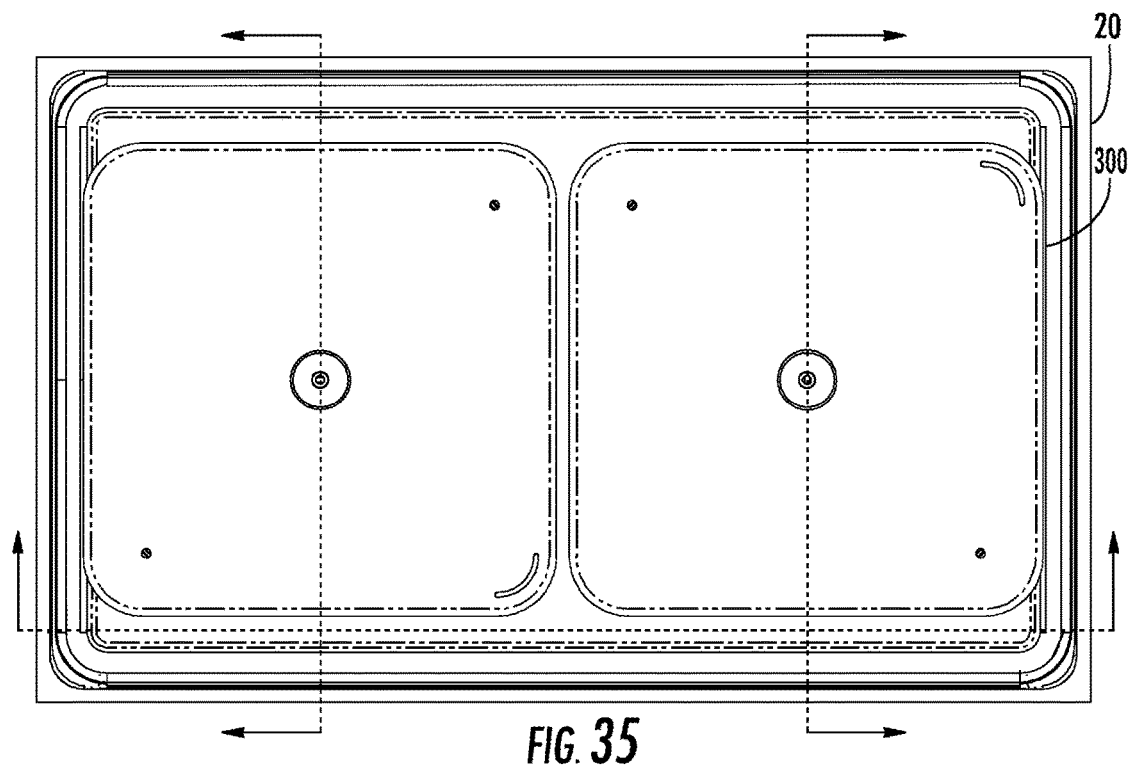
FIG. 35 is a top view of the temperature regulation device of FIG. 29 positioned in the well, according to an exemplary embodiment.

Referring now to FIGS. 33-34, the temperature regulation device additionally includes an insert 302 (e.g., inset, inset, tray, receiver, support, bracket, receptacle, etc.). The insert 302 is configured to fit within a well 20, and be supported by the bottom wall and/or side wall of the well 20. The receptacle 302 defines an exterior or side wall 306 and one or more inner perimeters 304 shaped to receive the pod 300 and position or orient the pods 300 within the well 20. Each inner perimeter 304 can be circular (as shown in FIG. 33), square, rectangular, or other appropriate shapes. The insert 302 further includes at least two receptacle supports, shown as a first receptacle support 380 and second receptacle support 385. In different configurations, the receptacle supports are configured to support the pod 300 at the first and second support surfaces 370, 375. In one configuration, the first receptacle support 380 supports the pod 300 at the first support surface 370. In another configuration, the second receptacle support 385 supports the pod 300 at the second support surface 370. These configurations correspond to a variety of positions (e.g., orientations, configurations, etc.) shown as first position 372 and second position 382, respectively, as described further herein.

The drainage column 335 is formed along a longitudinal axis 345 at the center 350 of the pod 300 extending from the top surface 310 of the pod 300 to the bottom surface 320 of the pod 300. The drainage column 335 allows drainage of liquid from the pod 300 by providing a passageway through the bottom of the pod 300. In some embodiments, the drainage column 335 is cylindrical in shape. In other embodiments, the drainage column 335 is rectangular in shape. In some other embodiments, the drainage column 335 may be any another shape to allow drainage of liquid from the pod 300. In some embodiments, the insert 302 is configured to capture (e.g., gather, receive) the liquid that drains from the pod 300.

Figure 36:
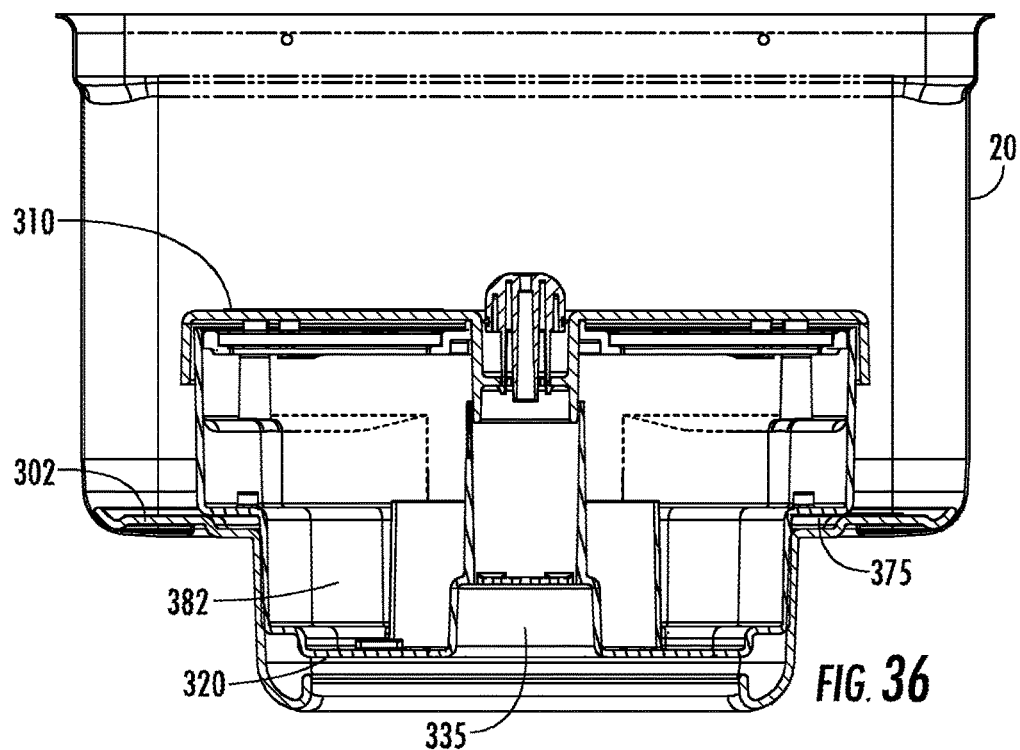
FIG. 36 is a section view of the temperature regulation device of FIG. 29 in a lower position, according to an exemplary embodiment.
Figure 37:
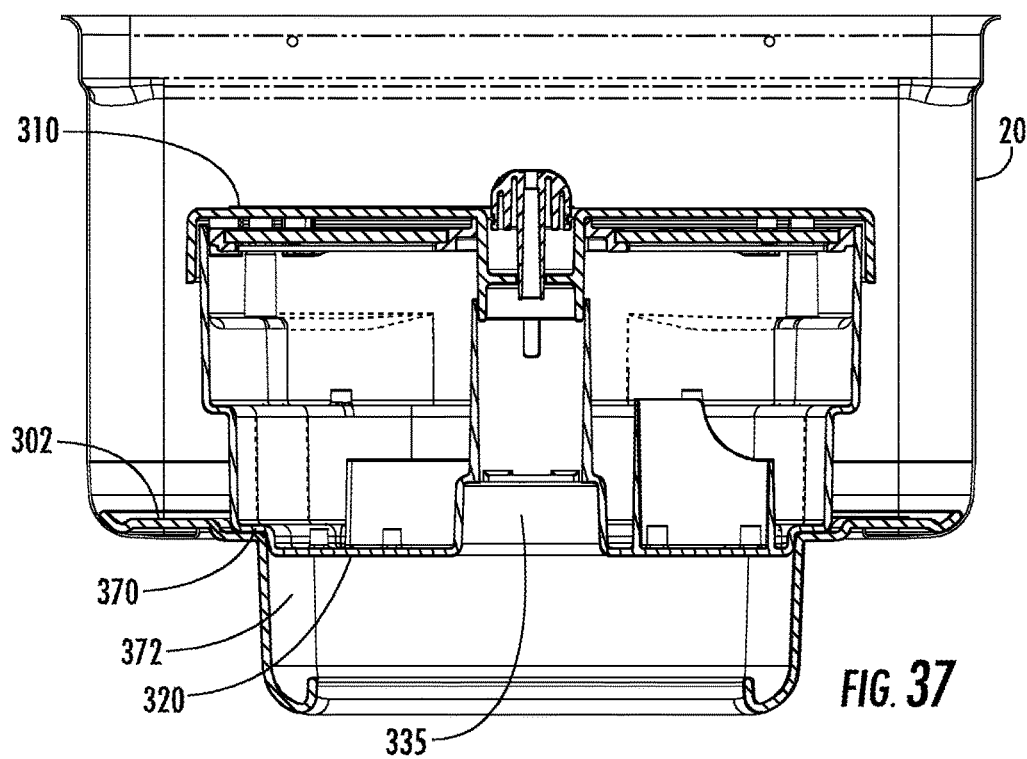
FIG. 37 is a section view of the temperature regulation device of FIG. 29 in an upper position, according to an exemplary embodiment.
Figure 38:
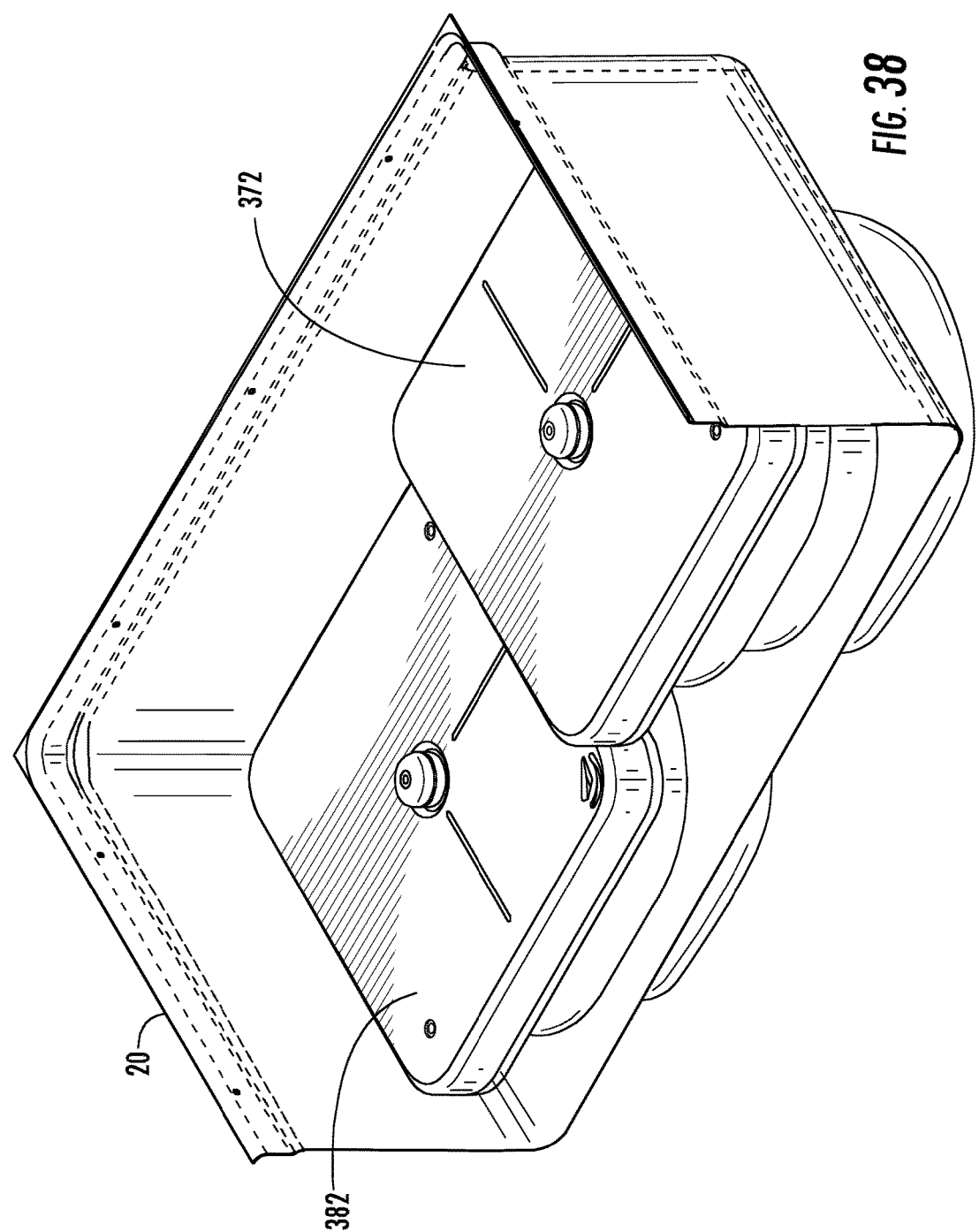
FIG. 38 is a perspective section view of the temperature regulation device of FIG. 29 positioned in the well, according to an exemplary embodiment.

Referring now to FIGS. 36-38, as described above, the pod 300 includes an adjustment mechanism or feature so it can be positioned within the insert 302, and within the well 20, in at least two different positions. When the pod 300 is positioned such that the first support surface 370 contacts (e.g., engages, rests on, is supported by, etc.) the first receptacle support 380, the pod height within the well 20 is different than when the pod 300 is positioned such that the second support surface 375 contacts (e.g., engages, rests on, is supported by, etc.) the second receptacle support 385. In some embodiments, the pod 300 may be positioned in a first position 372 within the well 20. As shown in FIG. 37, when in the first position 372, the pod 300 is supported by the first receptacle support 380 at a first support surface 370. In some embodiments, the pod 300 may be positioned in a second position 382 within the well 20. As shown in FIG. 36, when in the second position 382, the pod 300 is supported by the second receptacle support 385 at a second support surface 375. Thus, the pod height and/or depth within the well 20 may be changed between two different positions. In particular, the distance between the top surface 310 of the pod 300 and the bottom wall 45 of the well 20 may be changed such that differing depths of food pan may be placed within the well 20.

The pod 300 is configured such that when in the first position 372, the pod 300 may be moved to a second position 382 by a user lifting the pod 300 out of the insert 302, rotating the pod 300 about a vertical axis 345 of the pod 300, and then inserting the pod 300 back into the insert 302. As shown, the vertical axis 345 extends through the center of the pod 300 from the top surface 310 to the bottom surface 320. In some embodiments, the first position 372 may be used in conjunction with a 2½-inch food pan and the second position 382 may be used in conjunction with a 4-inch food pan.

As shown in FIG. 38, in some embodiments, more than one pod 300 may be positioned within the well 20. In one embodiment, two pods 300 may be placed in two different configurations where one pod 300 is positioned deeper within the well than the other pod 300 using the support surfaces 370, 375 as described above. In other embodiments, the pods 300 may be placed in the same configuration within the well 20.

Figure 39:
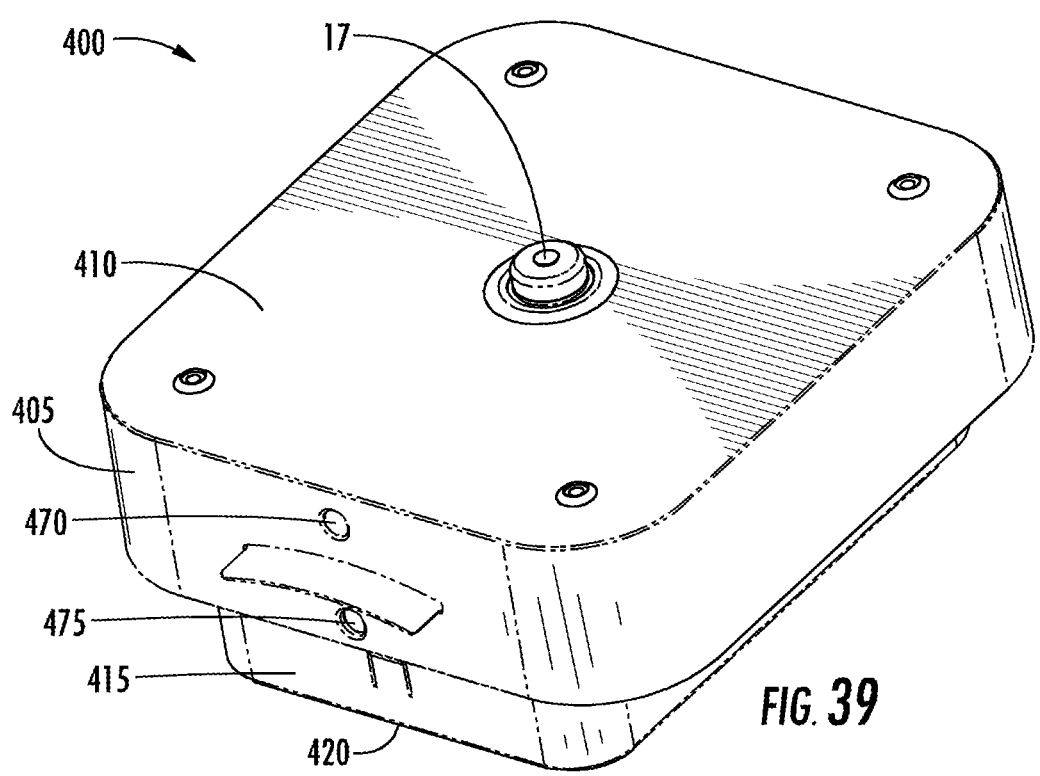
FIG. 39 is a perspective view of a temperature regulation device, according to an exemplary embodiment.
Figure 40:
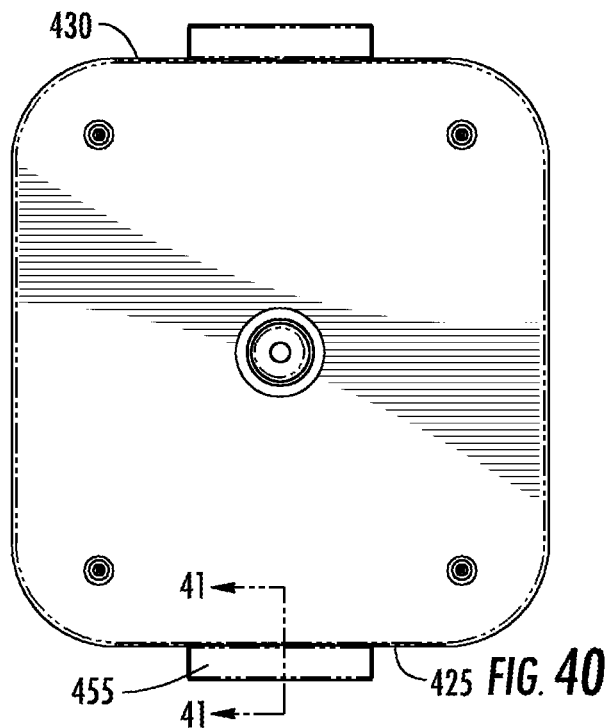
FIG. 40 is a top view of the temperature regulation device of FIG. 39, according to an exemplary embodiment.
Figure 41:
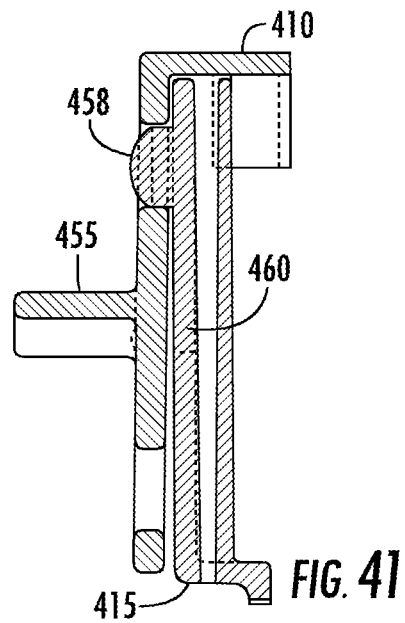
FIG. 41 is a side view of a height adjustment mechanism of the temperature regulation device of FIG. 39, according to an exemplary embodiment.

Referring now to FIGS. 39-41, yet another embodiment of the temperature regulation device is illustrated. In FIGS. 39-41, the temperature regulation device is shown as module or pod 400. The pod 400 may be positioned within the well 20 as shown in FIG. 1. The pod 400 includes a housing with a top portion 405, a bottom portion 415, and an adjustment mechanism or feature that allows the varying positioning of the top portion 405 relative to the bottom portion 415. The top portion 405 includes a top surface 410. The top portion 405 additionally includes a handle portion 455. The bottom portion 415 includes a bottom surface 420. The bottom portion 415 additionally includes a flexing portion 460 and a protrusion 458 formed on the flexing portion 460. The pod 400 further includes at least two sides 425 and 430 and a drainage column.

As shown, the pod 400 additionally includes at least two catches, shown as an upper catch 470 and lower catch 475. The upper and lower catches 470, 475 are configured to accept the protrusion 458. As shown, in one embodiment, the upper and lower catches 470, 475 are circular in shape. In other embodiments, the upper and lower catches 470, 475 are rectangular in shape. In some other embodiments, the upper and lower catches 470, 475 may be any another shape suitable to accept the protrusion 458. In this regard, in some embodiments, the protrusion is circular in shape. In other embodiments, the protrusion 458 is rectangular in shape. In some other embodiments, the protrusion 458 may be any another shape suitable to fit into the upper and lower catches 470, 475.

The protrusion 458 is configured to couple to the upper and lower catches 470, 475 in different positions of the pod 400. In an upper position of the pod 400, the protrusion 458 is coupled (e.g., engaged, inserted, etc.) with the upper catch 470. In a lower position of the pod 400, the protrusion 458 is coupled (e.g., engaged, inserted, etc.) with the lower catch 475. As the pod 400 is moved from the upper position to the lower position, the top surface 410 of the pod 400 moves nearer the bottom surface 420 of the pod 400.

To move the pod 400 between the upper position and the lower position, a user presses on the protrusion 458 so as to flex the flexing portion 460 of the pod 400 and move (e.g., decouple) the protrusion 458 away from either the upper catch 470 or the lower catch 475. To facilitate moving the pod 400 between the upper position and the lower position, the user may use the handle portion 455 to grip the top portion 405 of the pod 400. While using the handle portion 455 to grip the top portion 405 of the pod 400, the user may adjust the pod to either a lower position or an upper position by moving the top surface 410 nearer or further, respectively, from the bottom surface 420.

Figure 42:
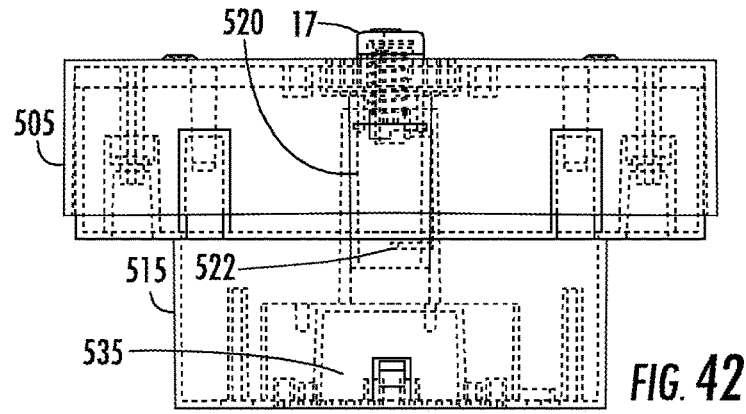
FIG. 42 is a side section view of the temperature regulation device of FIG. 39, according to an exemplary embodiment.
Figure 43:
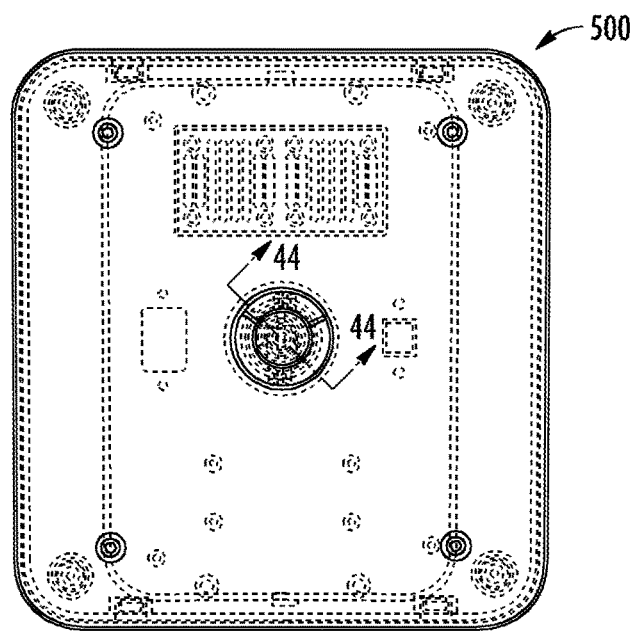
FIG. 43 is a top view of a temperature regulation device, according to an exemplary embodiment.
Figure 44:
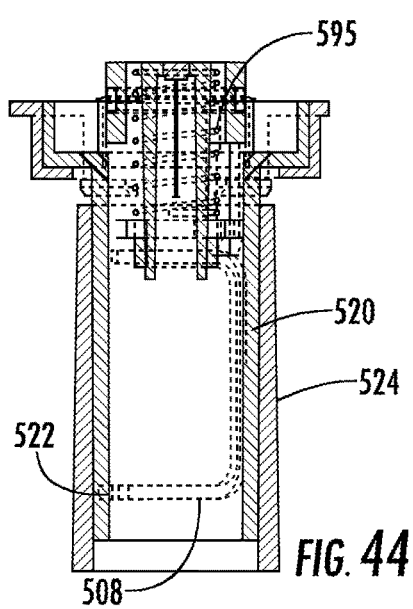
FIG. 44 is a section view of a center piece of the temperature regulation device of FIG. 43, according to an exemplary embodiment.

Referring now to FIGS. 42-44, yet another embodiment of the temperature regulation device is illustrated. In FIGS. 42-44, the temperature regulation device is shown as module or pod 500. The pod 500 may be positioned within the well 20 as shown in FIG. 1. The pod 500 includes a housing with a top portion 505, a bottom portion 515, and an adjustment mechanism or feature that allows the varying positioning of the top portion 505 relative to the bottom portion 515. The pod 500 further includes a center piece 520, a drainage column 535, and one or more biasing members 595. The drainage column 535 allows for drainage of liquid from the pod 500 by providing a passageway through the bottom portion 515 of the pod 500. In some embodiments, the drainage column 535 is cylindrical in shape. In other embodiments, the drainage column 535 is rectangular in shape. In some other embodiments, the drainage column 535 may be any other shape to allow drainage of liquid from the pod 500.

The center piece 520 includes a protrusion 522 configured to engage with a track 508. The track 508 allows the protrusion 522 to engage at different heights, an upper position and a lower position, similarly described above with regard to the other embodiments. To move between an upper position and a lower position, the center piece 520 may be rotated by 90 degrees to engage and disengage the protrusion 522 from the track 508. In other embodiments, the center piece 520 may be rotated by 180 degrees to engage and disengage the protrusion 522. In some other embodiments, the center piece 520 may be rotated by any suitable angle to facilitate the engagement or disengagement of the protrusion 522 with the track 508 and thus, facilitate the position of the pod 500 between the upper position and the lower position.

The biasing members 595, as shown in FIG. 44, extend within the center piece 520. The biasing members 595 bias the top portion 505 relative (e.g., away from, upward) to the bottom portion 515. In some embodiments, the biasing members 595 are springs. In other embodiments, the biasing members 595 are other resilient members configured to maintain tension between the top portion 505 and the bottom portion 515.

Figure 45:
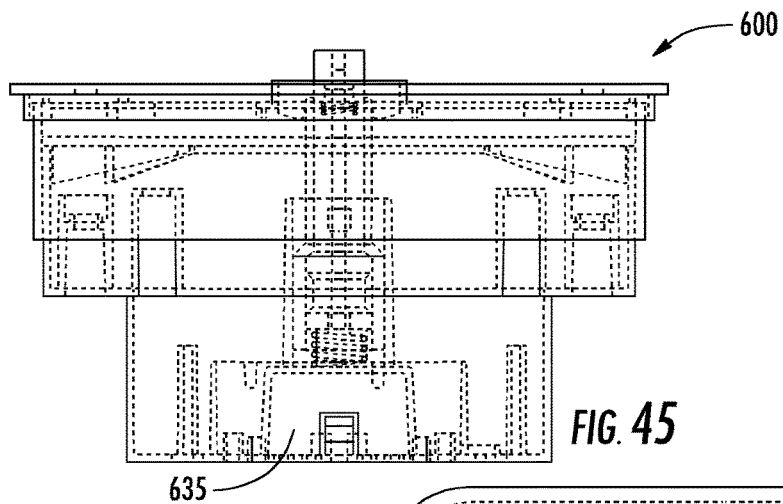
FIG. 45 is a side view of a temperature regulation device, according to an exemplary embodiment.
Figure 46:
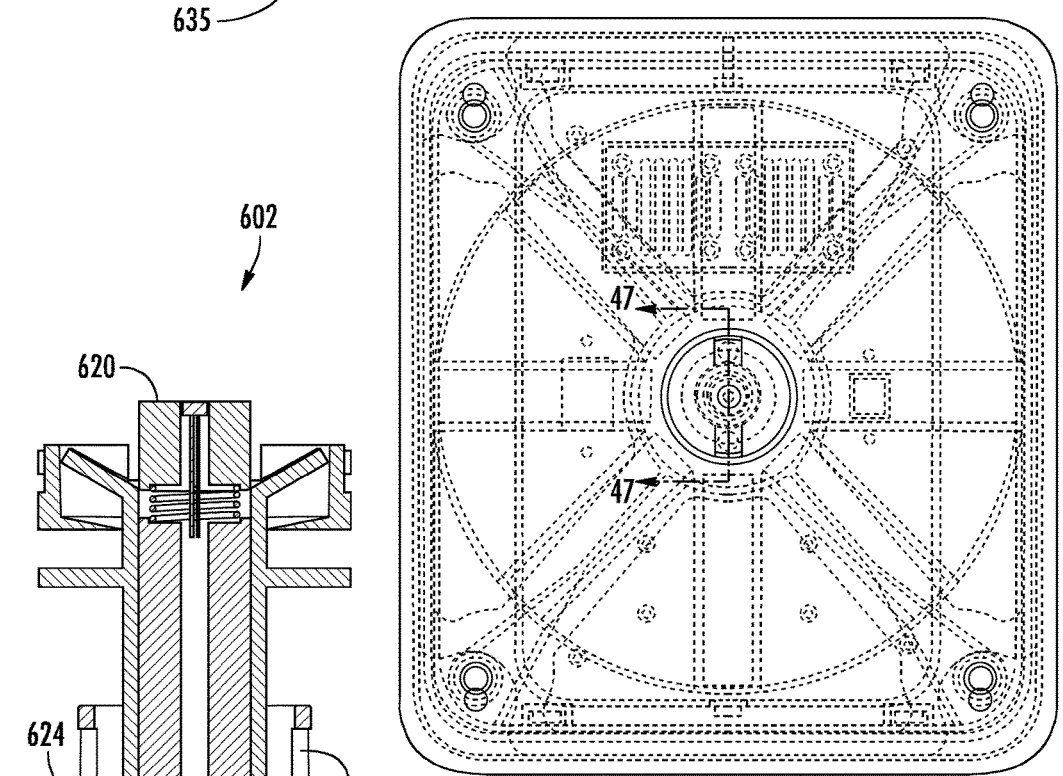
FIG. 46 is a top view of the temperature regulation device of FIG. 45, according to an exemplary embodiment.
Figure 47:
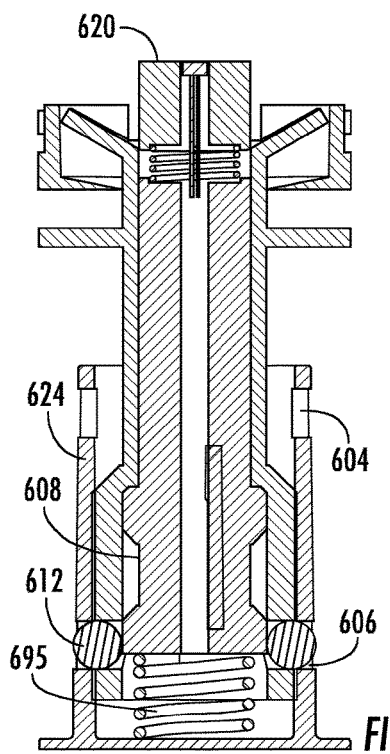
FIG. 47 is a section view of a center piece of the temperature regulation device of FIG. 45, according to an exemplary embodiment.

Referring now to FIGS. 45-47, yet another embodiment of the temperature regulation device is illustrated. In FIGS.

45-47, the temperature regulation device is shown as module or pod 600. As with other embodiments, the pod 600 may be positioned within the well 20 as shown in FIG. 1. The pod 600 includes a housing with a top portion, a bottom portion, and an adjustment mechanism or feature that allows the varying positioning of the top portion relative to the bottom portion. The adjustment mechanism includes a center piece 620 (e.g., inner member, button, actuator, etc.), an outer column 624, an inner column, one or more engagement members 612 (e.g., ball or detent bearings), and one or more biasing members 695. A drainage column 635 and biasing members 695 may be configured and positioned similarly with respect to the embodiment described above in FIGS. 42-44.

As shown, the outer column 624 includes an upper aperture 604 (e.g., hole, slot, catch) and a lower aperture 606 (e.g., hole, slot, catch). The apertures 604, 606 are configured to receive the engagement members 612 in different positions of the pod 600. In an upper position, the engagement members 612 are engaged with the upper aperture 604. In a lower position, the engagement members 612 are engaged with the lower aperture 606 (as shown in FIG. 47). The outer column 624 includes an angled portion (e.g., flange) that engages or interacts with an angled stop surface on the top portion of the pod 600. The angled stop surface limits the downward motion of the angled portion of the outer column 624. The center piece 620 includes a recess or pocket 608 that receives the engagement members 612 when the pod 600 is moving between an upper position and a lower position. The recess or pocket 608 transfers the engagement members 612 between the upper aperture 604 and the lower aperture 606. The center piece 620 is biased toward the top portion of the pod by the biasing member 695 such that the engagement members 612 are held in position while engaged with either the upper aperture 604 or the lower aperture 606.

To move the pod 600 between the upper position and the lower position, a user activates the push-push adjustment mechanism by pressing (e.g., depressing) the center piece 620 so as to engage and disengage the engagement members 612 from the upper aperture 604 and lower aperture 606. For example, to move from a lower position to an upper position, the user presses (e.g., depresses) the center piece 620 until the recess or pocket 608 aligns with the lower aperture 606 and the engagement members 612 slide into the recess or pocket 608. The center piece 620, biased toward the top portion of the pod 600 by the biasing member 695, moves upward until the engagement members 612 are transferred from the recess or pocket 608 to the upper aperture 604. To move from the upper position to the lower position, the user presses (e.g., depresses) the center piece 620 until the recess or pocket 608 aligns with the upper aperture 604, the engagement members 612 slide from the upper aperture 604 into the recess or pocket 608, and the engagement members 612 are transferred from the recess or pocket 608 to the lower aperture 606.

Figure 48:
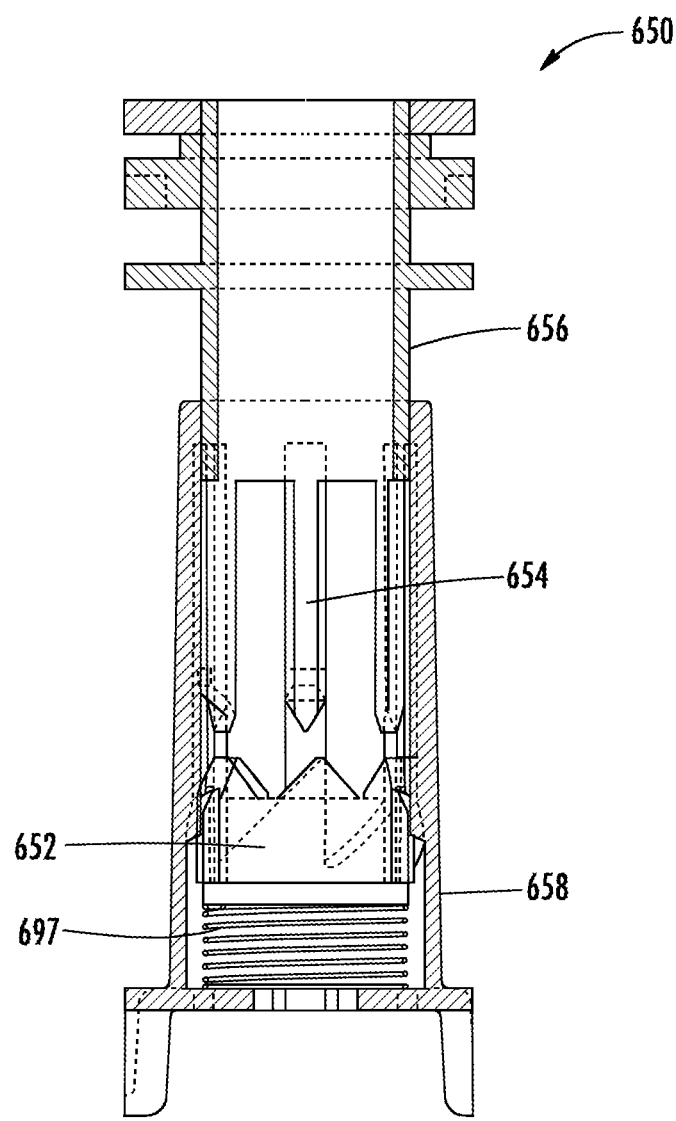
FIG. 48 is a section view of a center piece of a temperature regulation device, according to an exemplary embodiment.

Referring now to FIG. 48, a further embodiment of the temperature regulation device is illustrated with an alternative (push-push) adjustment mechanism. Center piece 650 may be used as an alternative to center piece 620 in the embodiment described above. Center piece 650 includes an inner column 656 and an outer column 658. In some embodiments, the outer column 658 is formed on the bottom portion of the pod 600.

The inner column 656 includes a rotating piece 652 and one or more engagement members 654. The rotating piece 652 is configured to couple to (e.g., engage, mate) the engagement members 654 in different heights. In this regard, the rotating piece 652 has at least two different height detents configured to couple to the engagement members 654 at least two different heights. The rotating piece 652 further has various angles where the engagement members 654 contact the rotating piece 652. To move from an upper position and a lower position, a user presses (e.g., depresses) the top surface of the pod toward the bottom surface of the pod. Similarly, to move from a lower position to an upper position, a user presses (e.g., depresses) the top surface of the pod toward the bottom surface of the pod. When the top of the pod is pressed down, the rotating piece 652 rotates and the angles incorporated within the rotating piece 652 engage (e.g., couple) the engagement members 654 at different height detents.

Figure 49:
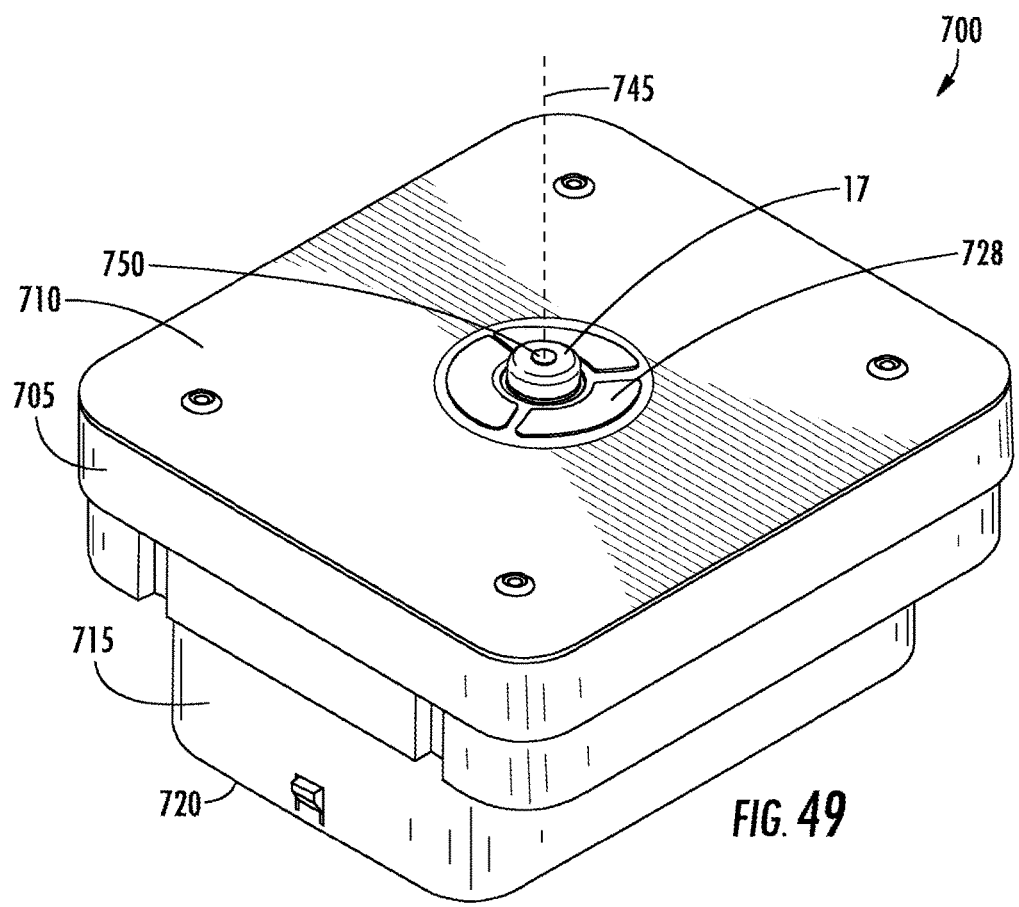
FIG. 49 is a perspective view of a temperature regulation device, according to an exemplary embodiment.
Figure 50:
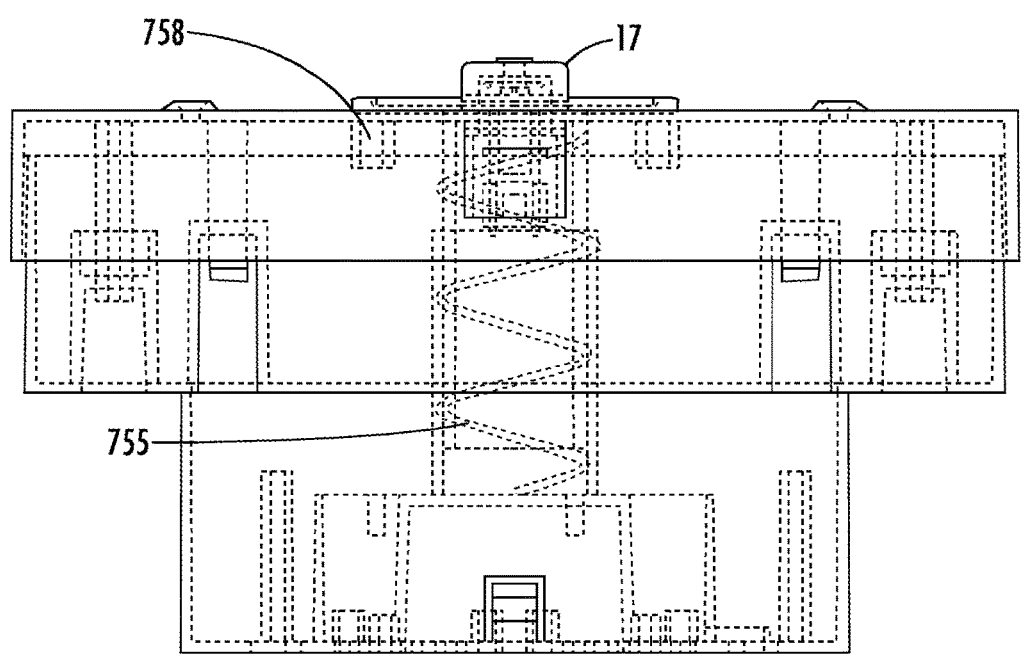
FIG. 50 is a side section view of the temperature regulation device of FIG. 49, according to an exemplary embodiment.

Referring now to FIGS. 49-50, yet another embodiment of the temperature regulation device is illustrated with an adjustment mechanism includes a first thread portion and a second thread portion that threadably engage each other to provide adjustment of the top portion and the bottom portion. In FIGS. 49-50, the temperature regulation device is shown as module or pod 700. As with other embodiments, the pod 700 may be positioned within the well 20 as shown in FIG. 1. The pod 700 includes a housing with a top portion 705, a bottom portion 715, and an adjustment mechanism or feature that allows the varying positioning of the top portion 705 relative to the bottom portion 715. The top portion 705 includes a top surface 710. The bottom portion 715 includes a bottom surface 720. The pod further includes a center piece 728 and a threaded center column 755. The center piece 728 is attached (e.g., coupled) to the top portion 705 of the pod 700 through connection 758 (e.g., snap, coupling). The center piece 728 is positioned approximately in the center 750 of the pod 700 and is rotatable about a vertical axis 745 of the pod 700. The center column 755 is coupled to the bottom portion 715.

To move the pod between an upper position and a lower position, a user rotates the center piece 728 about axis 745. As the user rotates the center piece 728, depending on the direction of rotation (e.g., clockwise, counter-clockwise), the distance between the top surface 710 and the bottom surface 720 changes. In one embodiment, when the user rotates the center piece 728 clockwise, the distance between the top surface 710 and the bottom surface 720 decreases. In another embodiment, when the user rotates the center piece 728 clockwise, the distance between the top surface 710 and the bottom surface 720 increases. The center piece 728 engages the threaded center column 755 to move along the threaded column such that the pod 700 may be positioned at any height ranging from an upper position (as shown in FIG. 50) to a lower position (e.g., infinite, indefinite, continuous, etc. adjustment).

Figure 51:
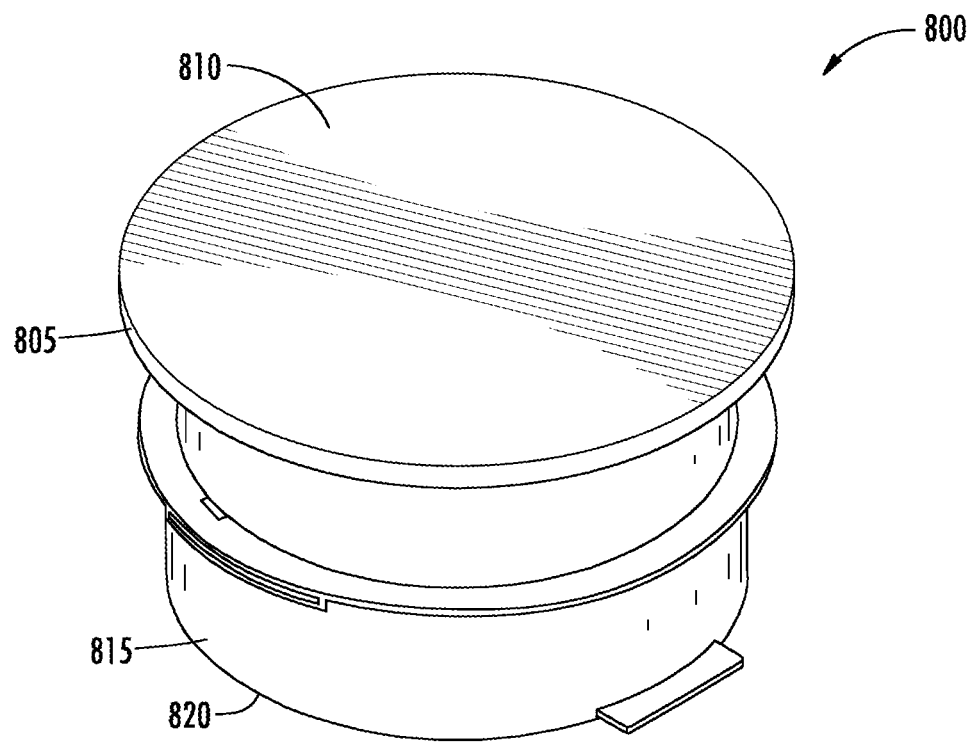
FIG. 51 is a perspective view of a temperature regulation device, according to an exemplary embodiment.
Figure 52:
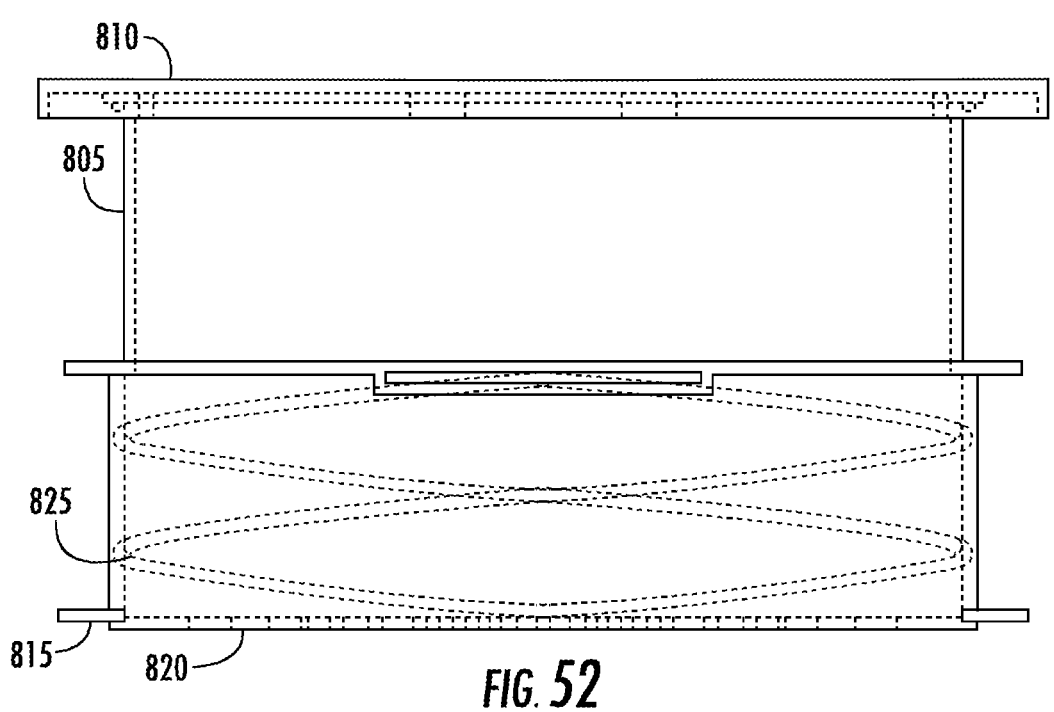
FIG. 52 is a side section view of the temperature regulation device of FIG. 51, according to an exemplary embodiment.

Referring now to FIGS. 51-52, yet another embodiment of the temperature regulation device is illustrated with an adjustment mechanism includes a first thread portion and a second thread portion that threadably engage each other to provide adjustment of the top portion and the bottom portion. In FIGS. 51-52, the temperature regulation device is shown as module or pod 800. Pod 800 may be positioned within the well 20 as shown in FIG. 1. The pod 800 includes a housing with a top portion 805, a bottom portion 815, and an adjustment mechanism or feature that allows the varying positioning of the top portion 805 relative to the bottom portion 815. The top portion 805 includes a top surface 910. The bottom portion 815 includes a bottom surface 920. The pod 800 further includes one or more internal threads 828 (e.g., mating, grooves, channels, projections, etc.) positioned on the bottom portion 815 of the pod 800. The top portion 805 is configured to rotate between an upper position (as shown in FIG. 52) and a lower position, including all pod heights in between the upper position and the lower position. In one embodiment, when the user rotates the top portion 805 clockwise, the distance between the top surface 810 and the bottom surface 820 decreases. In another embodiment, when the user rotates the top portion 805 clockwise, the distance between the top surface 810 and the bottom surface 820 increases.

In some embodiments, and as shown, the pod 800 is circular in shape. In some other embodiments, the pod 800 is rectangular in shape. In further embodiments, the pod 800 is any other shape suitable to rotate between an upper and lower position.

Figure 53:
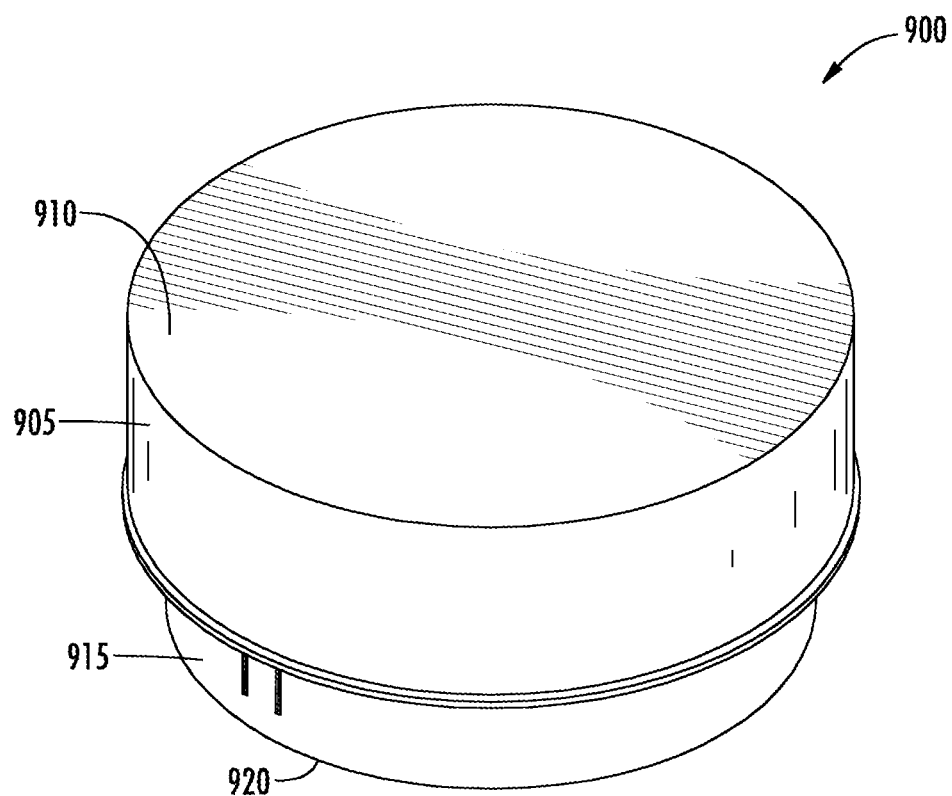
FIG. 53 is a perspective view of a temperature regulation device, according to an exemplary embodiment.
Figure 54:
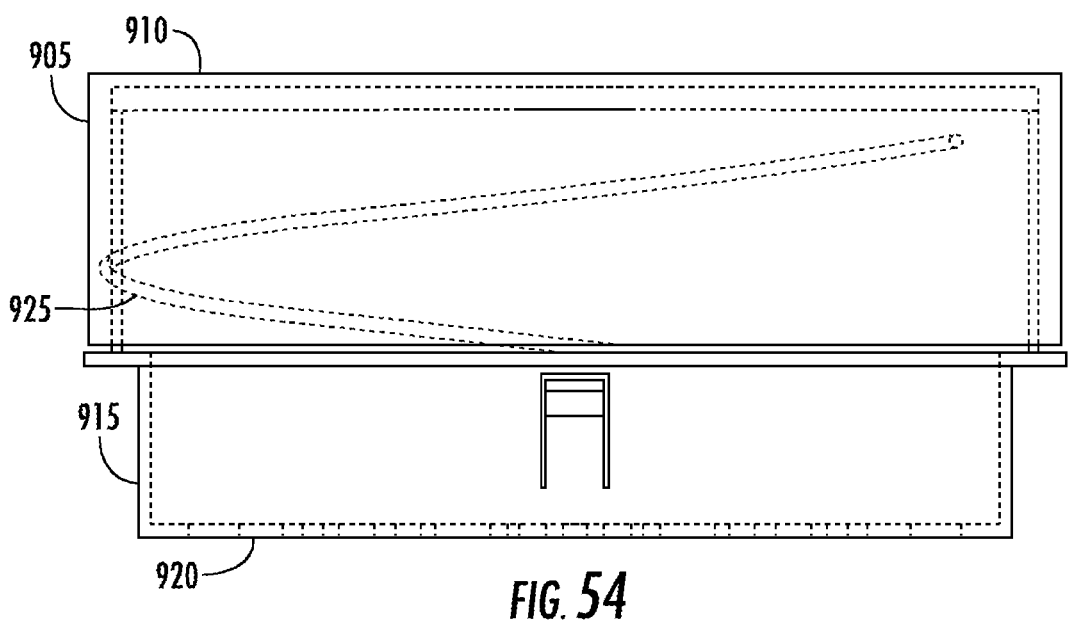
FIG. 54 is a side section view of the temperature regulation device of FIG. 53, according to an exemplary embodiment.

Referring now to FIGS. 53-54, yet another embodiment of the temperature regulation device is illustrated with an adjustment mechanism includes a first thread portion and a second thread portion that threadably engage each other to provide adjustment of the top portion and the bottom portion. In FIGS. 53-54, the temperature regulation device is shown as module or pod 900. Pod 900 may be positioned within the well 20 as shown in FIG. 1. The pod 900 includes a housing with a top portion 905, a bottom portion 915, and an adjustment mechanism or feature that allows the varying positioning of the top portion 905 relative to the bottom portion 915. The top portion 905 includes a top surface 910. The bottom portion 915 includes a bottom surface 920. The pod 900 further includes one or more threads 928 (e.g., mating, grooves, channels, projections, etc.). In some embodiments, the threads 928 include an external thread positioned on the top portion 905 and an internal thread positioned on the bottom portion 915 of the pod 900. The top portion 905 is configured to rotate between an upper position and a lower position (as shown in FIG. 54), including all pod heights in between the upper position and the lower position. In one embodiment, when the user rotates the top portion 905 clockwise, the distance between the top surface 910 and the bottom surface 920 decreases. In another embodiment, when the user rotates the top portion 905 clockwise, the distance between the top surface 910 and the bottom surface 920 increases.

In some embodiments, and as shown, the pod 900 is circular in shape. In some other embodiments, the pod 900 is rectangular in shape. In further embodiments, the pod 900 is any other shape suitable to rotate between an upper and lower position.

The construction and arrangement of the apparatus, systems, and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

References herein to the positions of elements (e.g., "top," "bottom," "above," "below," "upper," "lower," etc.) are merely used to describe the orientation of various elements as illustrated in the Figures. It should be noted that the orientation of various elements may differ according to other exemplary embodiments, and that such variations are intended to be encompassed by the present disclosure.

What is claimed is:

1. A temperature regulation device comprising: a housing for positioning at least partially in a well and including a top surface, a bottom surface, a first side, and a second side, wherein the first side includes a first support surface that supports the housing when the housing is positioned in a first position relative to the well, and wherein the second side includes a second support surface that supports the housing when the housing is positioned in a second position relative to the well, the first side positioned opposite from the second side; wherein the first support surface is spaced apart from the top surface by a first dimension, and the second support surface is spaced apart from the top surface by a second dimension, wherein the first dimension is larger than the second dimension; wherein the first side comprises a first recess extending from the bottom surface toward the top surface and terminating at the first support surface, and the second side comprises a second recess extending from the bottom surface toward the top surface and terminating at the second support surface.

2. The temperature regulation device of claim 1, wherein the housing is rotatable about a vertical axis of the housing to achieve the first position or the second position of the housing, wherein the vertical axis extends through a center of the housing from the top surface to the bottom surface.

3. The temperature regulation device of claim 1, wherein the housing is rotated 180 degrees to achieve the first position or the second position of the housing.

4. The temperature regulation device of claim 1, wherein the well supports one or more food pans, wherein the housing is configured to provide induction heating to the one or more food pans.

5. An apparatus for heating a food pan positioned in a well of food service equipment, the apparatus comprising:
a housing comprising a top portion including a top surface and a bottom portion including a bottom surface, the housing further comprising a first side, a second side opposite the first side, wherein the first side and the second side extend from the bottom surface;

a height adjustment mechanism to adjust the spacing between the top surface and the bottom surface, the height adjustment mechanism comprising:
- a first height catch disposed on the bottom portion, wherein the first height catch is a first distance from the top surface;
- a second height catch disposed on the bottom portion, wherein the second height catch is a second distance from the top surface; and
- a first inner member disposed on the top portion of the housing, the first inner member releasably and selectively engages the first height catch or the second height catch;
- wherein the first inner member is engaged with the first height catch in a first position, and wherein the first inner member is engaged with the second height catch in a second position;

wherein the top surface is nearer the bottom surface in the second position than in the first position.

6. The apparatus of claim 5, wherein the top portion is movable and the bottom portion is stationary.

7. The apparatus of claim 6, further comprising:
- one or more springs, wherein the one or more springs are configured to bias the top portion relative to the bottom portion.

8. The apparatus of claim 5, further comprising:
- a second inner member included on the second side disposed on the top portion.

9. The apparatus of claim 8, wherein the first inner member and the second inner member are configured to flex to disengage the top portion from the first height catch.

10. The apparatus of claim 9, wherein the first inner member and the second inner member are configured to flex to disengage the top portion from the second height catch.

11. An apparatus for heating a food pan positioned in a well of food service equipment, the apparatus comprising:
- a housing comprising:
  - a top portion having a top surface;
  - a bottom portion having a bottom surface, the top portion threadably engaged with the bottom portion;
- an adjustment mechanism, the adjustment mechanism comprising:
  - a first thread portion on the top portion comprising at least one of an internal thread or an external thread;
  - a second thread portion on the bottom portion engaged with the first thread portion and comprising at least one of an internal thread or an external thread;
  - wherein rotation of the top portion relative to the bottom portion and engagement of the first thread portion with the second thread portion moves the top portion relative to the bottom portion between at least a first position and a second position, wherein the first position defines a first dimension between the top surface and the bottom surface and the second position defines a second dimension between the top surface and the bottom surface different than the first dimension.

12. The apparatus of claim 11, wherein the first thread portion is disposed on a center piece connected to the top portion, and the second thread portion is disposed on a center column connected to the bottom portion.

13. The apparatus of claim 11, wherein the first thread portion is disposed on an interior side wall on the top portion, and the second thread portion is disposed on an exterior side wall on the bottom portion.

14. The apparatus of claim 11, wherein the first thread portion is disposed on an exterior side wall on the top portion, and the second thread portion is disposed on an interior side wall on the bottom portion.

* * * * *